(12) United States Patent
Hoff

(10) Patent No.: US 12,503,409 B2
(45) Date of Patent: Dec. 23, 2025

(54) METHOD OF PH REGULATING BIOMASS RESIDUES

(71) Applicant: Advanced Substrate Technologies A/S, Randers SØ (DK)

(72) Inventor: Svend Hoff, Odder (DK)

(73) Assignee: Advanced Substrate Technologies A/S, Randers SØ (DK)

( * ) Notice: Subject to any disclaimer, the term of this patent is extended or adjusted under 35 U.S.C. 154(b) by 960 days.

(21) Appl. No.: 17/641,682

(22) PCT Filed: Sep. 16, 2020

(86) PCT No.: PCT/EP2020/075854
§ 371 (c)(1),
(2) Date: Mar. 9, 2022

(87) PCT Pub. No.: WO2021/053009
PCT Pub. Date: Mar. 25, 2021

(65) Prior Publication Data
US 2022/0324768 A1  Oct. 13, 2022

(30) Foreign Application Priority Data
Sep. 17, 2019  (EP) .................................. 19197740

(51) Int. Cl.
*C05F 17/10* (2020.01)
*B01J 20/24* (2006.01)
(Continued)

(52) U.S. Cl.
CPC ............... *C05F 17/10* (2020.01); *B01J 20/24* (2013.01); *C05F 1/002* (2013.01); *C05F 3/00* (2013.01);
(Continued)

(58) Field of Classification Search
CPC .. C05F 17/10; C05F 1/002; C05F 3/00; C05F 11/00; C10L 5/44; C09K 17/14; B01J 20/24; C12N 3/00; C12N 1/14
See application file for complete search history.

(56) References Cited

U.S. PATENT DOCUMENTS 5,846,787 A  * 12/1998 Ladisch ......... C12Y 302/01004
                                                  435/99
6,264,715 B1    7/2001  Lamour et al.
(Continued)

FOREIGN PATENT DOCUMENTS

AU      2005226345 B2 * 10/2005 ................ C10L 5/44
WO         0111942 A1    2/2001
(Continued)

OTHER PUBLICATIONS

Database WPI, Week 201141, Thomson Scientific, London, GB, AN 2011-D77079, XP002798409, & KR 2011 0003190 U (Eikon Space), Mar. 30, 2011, abstract.
(Continued)

*Primary Examiner* — Wayne A Langel
(74) *Attorney, Agent, or Firm* — DINSMORE & SHOHL LLP

(57) ABSTRACT

A method of pH regulating biomass residues includes the steps of: providing biomass residue comprising solid and liquid parts; exposing the biomass to one or more separation steps, wherein said biomass is separated into one or more solid fractions having a reduced content of water, and one or more fluid fractions; and adding a pH regulator to the biomass residue, and/or the one or more solid fractions, and/or the one or more fluid fractions, wherein the pH regulator comprises a juice derived from agricultural biomass and/or fish manure.

20 Claims, 5 Drawing Sheets

(51) Int. Cl.
  *C05F 1/00*      (2006.01)
  *C05F 3/00*      (2006.01)
  *C05F 11/00*     (2006.01)
  *C09K 17/14*     (2006.01)
  *C10L 5/44*      (2006.01)
  *C12N 1/14*      (2006.01)
  *C12N 3/00*      (2006.01)

(52) U.S. Cl.
  CPC .............. *C05F 11/00* (2013.01); *C09K 17/14* (2013.01); *C10L 5/44* (2013.01); *C12N 1/14* (2013.01); *C12N 3/00* (2013.01); *C10L 2200/0469* (2013.01)

(56) References Cited

U.S. PATENT DOCUMENTS

| | | | |
|---|---|---|---|
| 6,419,788 B1 * | 7/2002 | Wingerson | D21C 1/02 162/14 |
| 9,914,948 B2 * | 3/2018 | Del Rio | D21C 9/166 |
| 2011/0300586 A1 * | 12/2011 | Liu | C08H 8/00 162/76 |

FOREIGN PATENT DOCUMENTS

| WO | 2005067581 A2 | 7/2005 |
|---|---|---|
| WO | 2016116113 A1 | 7/2016 |

OTHER PUBLICATIONS

Database WPI, Week 201735, Thomson Scientific, London, GB; AN 2017-22750A, XP002798410, & CN 106 538 284 A (Univ beijing Forestry), Mar. 29, 2017, abstract.

Database WPI, Week 201961, Thomson Scientific, London, GB; AN 2019-62048P, XP002798408 & CN 109988040 A (Zhang Q) Jul. 9, 2019—abstract.

Database WPI; Week 201735 Thomson Scientific, London, GB; AN 2017-229410 & CN 106 542 889 A (Yuexi Simin Ecological Agric Co Ltd) Mar. 29, 2017 (Mar. 29, 2017.

Database WPI; Week 201976 Thomson Scientific, London, GB; AN 2019-74086G & CN 110 140 604 A (Chengdu Wood Ecological Agric CO Ltd), Aug. 20, 2019, XP 2801088A.

* cited by examiner

METHOD OF PH REGULATING BIOMASS RESIDUES

CROSS-REFERENCE TO RELATED APPLICATIONS

This application is the U.S. National Stage of PCT/EP2020/075854 filed on Sep. 16, 2020, which claims priority to European Patent Application 19197740.4 filed on Sep. 17, 2019, the entire content of both are incorporated herein by reference in their entirely.

FIELD OF THE INVENTION

The present invention relates to a method of pH regulating biomass residues, where the biomass residue may be fresh biomass, such as fresh liquid manure from cattle, horses, pigs, and poultry livestock, or fermented biomass, such as degassed biomass from an anaerobic fermenter.

The present invention further relates to use of the pH regulated biomass residue as fertilizer, soil improver, litter or bedding for animals, substrate for cultivating fungal cells and/or spores, substrate for cultivating plants, gas absorption medium, and feedstock for biogas.

BACKGROUND OF THE INVENTION

Biomass can be converted into biogas, and the biogas may be used as a direct substitute for fossil fuel such as natural gas. Thus, biomass may play a key role when replacing fossil energy sources with renewable energy sources.

The conversion of biomass into biogas is based on anaerobic digestion or fermentation of the fermentable carbon and nitrogen parts contained in the biomass. The anaerobic digestion results in two main products: biogas and digestate. The digestate is also referred to as the degassed biomass (DB).

The environmental and commercial advantages of biomass should be assessed over the full life cycle of the biomass. An example of a biomass life cycle is illustrated in FIG. 1. It is seen that the exploitation of the biomass energy may be improved by reducing the energy consuming processes (e.g. the energy required for transport, harvesting, cultivation), and by increasing the amounts of valuable output products (e.g. the amount of biogas or the amount of co-products that can be recycled).

The exploitation of the biomass energy is not only improved by increasing the amounts of biogas and recycled co-products, but also by improving the quality of the biomass feedstock and the recycled co-products. For example, a biogas composition with added value may be obtained by adjusting the conversion process, e.g. by upgrading the carbon to nitrogen (C/N) ratio of the biomass subjected to the fermenters. Also, recycled co-products with added value may be obtained, e.g. if the co-product may be adapted to an improved ready-to-use form, such as a growth substrate for mushrooms or plants comprising desired amounts of macro- and/or micronutrients, or as litter or bedding for animals having antimicrobial effects.

Transport of the biomass and the related output products constitutes a main limitation to the biomass exploitation efficiency. Transport is involved in several processes as illustrated in FIG. 1. For example, both the harvesting, the handling and local storage, and the subsequent transfer to a biomass plant, require transport. Also, the resulting biofuel must be distributed from the plant to end users, as well as the co-products which can be recycled must be transported to the site of recycling.

To fully capitalize on the environmental and commercial advantages of biomass, the biomass exploitation efficiency must be improved.

SUMMARY OF THE INVENTION

The present disclosure provides a method of pH regulating biomass residues, which may significantly improve the biomass exploitation efficiency. Advantageously, the method provides an increased quantity of co-products, which may be recycled, as well as recyclable co-products with added value. Advantageously, the co-products are used as fertilizers, soil improvers, growth substrate for cultivating plants, fungal cells, and/or spores, litter or bedding for animals, gas adsorption or absorption medium, and/or feedstock for biogas, and the co-products are preferably adapted to be in an improved ready-to-use form via adjusted pH, as well as being manufactured in an improved organic and/or eco-friendly way with improved recycling of raw materials and nutrients.

The method further provides improved biomass exploitation efficiency by improving the transport efficiency of the biomass and the related output products. Advantageously, the biomass may be converted into a more energy dense form, such as compacted solid material compared to a liquid. In addition, the method may provide more efficient logistics between farms and biomass processing plants, by facilitating full loaded roundtrips.

A first aspect of the invention relates to a method of pH regulating biomass residues, comprising the steps of:
a. providing biomass residue comprising solid and liquid parts,
b. exposing the biomass to one or more separation steps, wherein said biomass is separated into one or more solid fractions having a reduced content of water, and one or more fluid fractions,
c. adding a pH regulator to the biomass residue, and/or the one or more solid fractions, and/or the one or more fluid fractions, wherein the pH regulator comprises a juice derived from an agricultural biomass and/or fish manure.

Preferably, the pH regulator is a juice derived from a plant biomass, such as grass, and/or preferably the pH regulator comprises ensiled agricultural biomass, such as ensiled plant biomass, e.g. ensiled grass or a juice derived from ensiled straw.

Preferably, the biomass residue is selected from the group of: fresh biomass, such as fresh liquid manure from cattle, horses, pigs, or poultry livestock, and fermented biomass, such as degassed biomass from an anaerobic fermenter, and combinations thereof.

A second aspect of the invention relates to the use of the pH regulated fractions obtained by the first aspect as fertilizer, soil improver, litter or bedding for animals, substrate for cultivating fungal cells and/or spores, substrate for cultivating plants, gas adsorption or absorption medium, and feedstock for biogas.

In a preferred embodiment, the pH regulated fraction is a fluid fraction used as fertilizer, soil improver, and/or gas adsorption or absorption medium. In a further preferred embodiment, the gas absorption medium is used for nitrogen gas absorption, and subsequently the N-enriched fluid is further used as a liquid fertilizer.

In another or further preferred embodiment, the pH regulated fraction is a solid fraction used as litter or bedding for animals, substrate for cultivating fungal cells and/or spores, substrate for cultivating plants, and/or feedstock for biogas.

BRIEF DESCRIPTION OF THE DRAWINGS

The invention will in the following be described in greater detail with reference to the accompanying drawings.

DETAILED DESCRIPTION OF THE INVENTION

Figure 1:
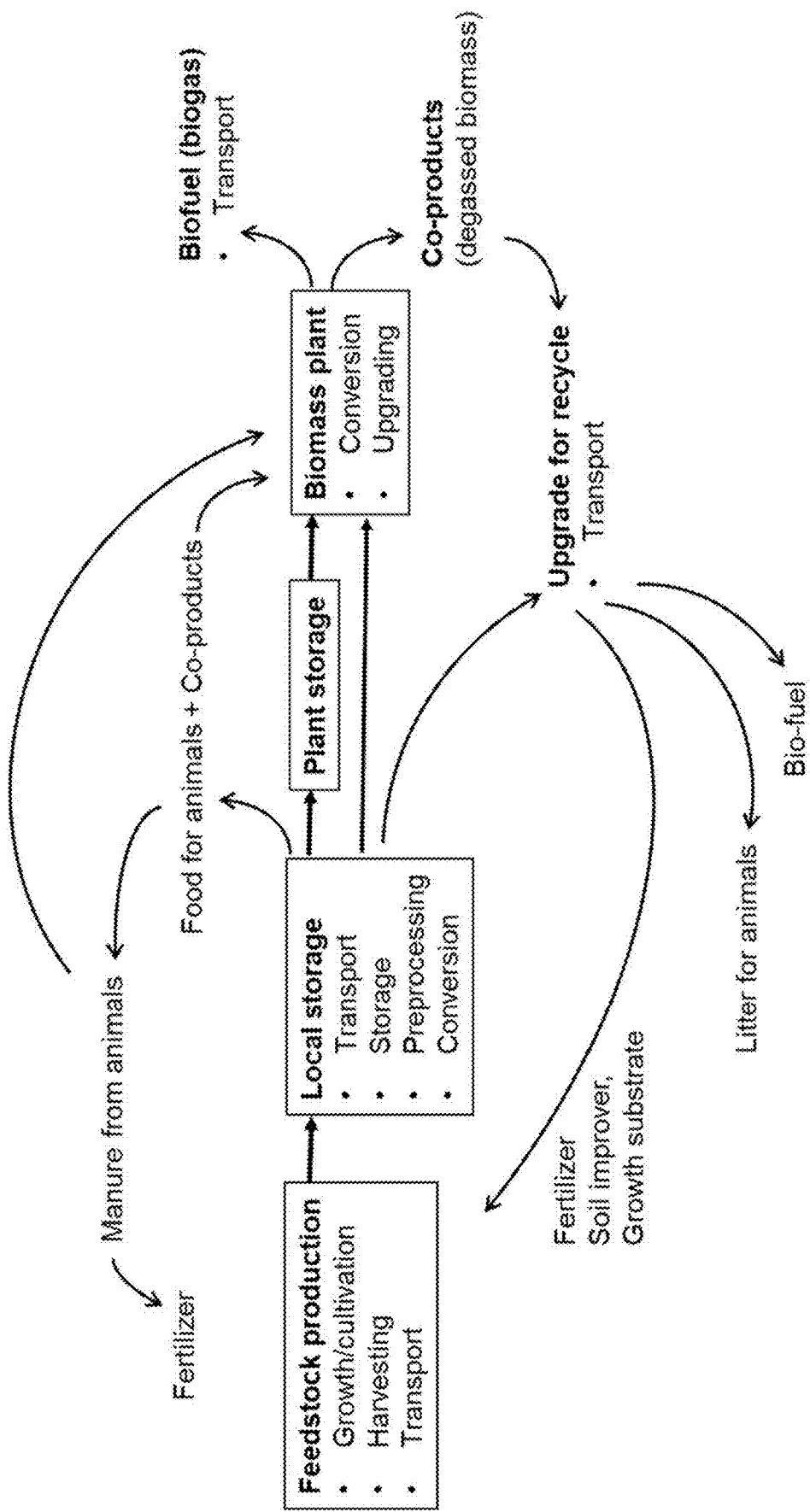
FIG. 1 shows an embodiment of a biomass life cycle for assessing biomass exploitation efficiency.

The invention is described below with the help of the accompanying figures. It would be appreciated by the people skilled in the art that the same feature or component of the device are referred with the same reference numeral or abbreviation in different figures.

Definitions

Biomass residue: Plant or animal material, which may be used for energy production. Examples of biomass residues include agricultural biomass (residues from field agricultural crops or crops processing), biomass from animal waste, forest biomass, municipal waste, and biogas plants.

Fresh biomass residue: Biomass residue, which has not been further processed.

Fermented biomass: Biomass residue, which has been fermented.

Biomass material: Organic material comprising fermentable carbon and nitrogen sources capable of being utilized by microbial organisms in a fermentation.

Feedstock biomass material: A substance used as a raw material in fermentation.

Pre-digested biomass material: Feedstock biomass material for an anaerobic fermentation obtained from a prior performed anaerobic fermentation.

Fermentation: Biological conversion of biomass materials. Fermentation is one of several steps in the processing of biomass. A fermentation is collectively all of the metabolic processes involved in the conversion of fermentable sugars into one or more fermentation end products, such as gases, acids, and alcohols.

Anaerobic fermentation: Also referred to as anaerobic digestion. Biological conversion of biomass in the absence of oxygen. Anaerobic fermentation produces two main products: biogas and digestate (also referred to as degassed biomass).

Degassed biomass (DB): Also referred to as digestate. Solid fraction obtained from anaerobic fermentation and biogas production. A digestate comprises a fibrous fraction, non-fibrous solids such as minerals, and a fluid/liquid fraction.

Fiber/fibrous material: Residual fraction of plant origin and part of a digestate resulting from an anaerobic fermentation and biogas production. The chemical composition of a fibrous material or fraction can comprise or consist of e.g. cellulose and hemi-cellulose, lignin, lignocellulose, and additional plant components such as e.g. dextrin, inulin, chitins, pectin, and beta-glucans.

Biogas: A mixture of gasses produced by the break-down of organic matter in the absence of oxygen. Biogas primarily contains methane ($CH_4$), and also carbon dioxide ($CO_2$), and may have smaller amounts of hydrogen sulphide ($H_2S$), moisture, and siloxanes.

Solid-fluid separation: The separation of free liquid and/or gasses, e.g. steam, from a mixture of solids and liquid.

Solid-liquid separation: The separation of free liquid from a mixture of solids and liquid. The separation produces two main products: liquid, also referred to as "reject", having a low solid load, and a solid fraction having a reduced content of liquid. The liquid may also be referred to as a fluid, that contain volatile and nutrients components.

Dewatering: The separation of free water from the solids portion of e.g. fibrous or solid fractions, sludge, or slurry by screening, centrifuging, filter pressing, screw pressing, single screw pressing, twin screw pressing, or other means. The separation produces two main products: reject water and a solid fraction having a reduced content of water, and a corresponding increased dry matter content.

Drying: The evaporation of fluid water from the solids portion of e.g. dewatered fibrous or solid fractions. The evaporated fluid may be water in the liquid phase, and/or gaseous water, i.e. steam, or mixtures thereof.

$NH_3$: Gaseous ammonia. An example of a volatile nitrogen-containing compound. Inhibits biogas fermentation in high concentrations. Inhibits mushroom growth in limited concentrations.

$NH4+$: Ammonium ion or ammonium salt. Also referred to as inorganic bound nitrogen. Capable of being converted into gaseous ammonia. An example of a precursor compound of a volatile nitrogen-containing compound.

Upgrade and Recycling of Degassed Biomass and Fresh Biomass

Fresh biomass, such as fresh liquid manure from cattle, is a biomass residue. Liquid cattle manure typically have a pH in the range of 7.0-7.5 cf. Example 1. Depending on the quality of the manure, parts of it is typically re-used as fertilizer/soil improver on agriculture fields and disposed as liquid fertilizer.

Degassed biomass (DB) is a co-product from a biogas plant and is considered a biomass residue. Degassed biomass is fermented biomass typically obtained from an anaerobic fermenter. In a preferred embodiment of the disclosure, the degassed biomass is from an anaerobic fermenter, and the anaerobic fermenter is further preferably part of a biogas plant. Degassed biomass typically has a pH in the range of 7.5-9.0, cf. Depending on the quality of the degassed biomass, parts of it may be re-used as fertilizer/soil improver on agriculture fields and disposed as liquid fertilizer, and parts of it may be re-used as growth substrate for plants and/or mushrooms.

Advantageously, the fresh biomass and degassed biomass is upgraded before re-using it as fertilizer or substrate, such that the amount and quality of the fertilizer or substrate is improved. The upgrading typically includes several post-treatments, such as sanitation, solid-liquid separation steps, nitrogen-stripping treatment, pH regulation, drying and compacting. The resulting biomass residue products or fractions from the upgrade may include both essentially solid and liquid product fractions, where a solid fibrous fraction may be suitable and efficient for the cultivation of plants and edible products, e.g. as a growth substrate for mushrooms, and the resulting liquid fractions may be N-enriched and thus suitable and efficient as liquid fertilizer in agriculture.

pH

The upgrade process may further include pH regulation step(s), whereby the resulting biomass residue fractions become even more efficient as fertilizer and as growth substrates for specific organism.

For example, a growth substrate having a low content of water and nitrogen, and a pH of about 7.0-7.5 may be particularly advantageous for the cultivation of fungal cells and/or spores, e.g. Basidiomycete cells, whereas a growth substrate having pH about 5.5-6.5 may be particularly advantageous for the cultivation of certain plants.

Also, a fertilizer/soil improver having a high liquid content, and a pH below 6.0 is particularly efficient, because it is easily distributed onto the soil with a high content of nitrogen. At higher pH, the amount of gaseous nitrogen ($NH_3$) increases, and thus upon distribution to the soil, the gaseous $NH_3$ will evaporate instead of fertilizing/improving the soil.

The resulting biomass fractions may also be suitable and efficient for use as litter or bedding for animals, since the pH influences the antimicrobial properties of the litter. Litter having a pH below 6 may thus be particularly antimicrobial.

The resulting biomass fractions may also be suitable and efficient for use as gas absorption medium and feedstock for biogas. The gas absorption capacity may increase if the pH of the medium decreases, e.g. the nitrogen absorption capacity may increase at lower pH. The resulting nitrogen enriched absorption medium may thus be efficiently used as nitrogen fertilizer. Similarly, biogas feedstock having a lower pH may be converted more efficiently into biogas.

The present disclosure relates to a method of pH regulating biomass residues, including the related biomass residue upgrade products. As described above, the pH of the biomass residue and products may be important for an efficient use of the products as growth substrate for plants and mushrooms, as fertilizer and soil improver, litter for animals, gas absorption medium, and feedstock.

In an embodiment of the disclosure, the pH regulated biomass fractions according to the present disclosure are used as fertilizer, soil improver, litter or bedding for animals, substrate for cultivating fungal cells and/or spores, substrate for cultivating plants, gas adsorption or gas absorption medium, and feedstock for biogas.

In a further embodiment, the gas absorption medium is further used as a fertilizer.

Solid-Fluid Separation

As a part of upgrading the biomass residue, the biomass residue is typically subjected to one or more solid-fluid separations, preferably including solid-liquid separation steps.

Figure 2A:
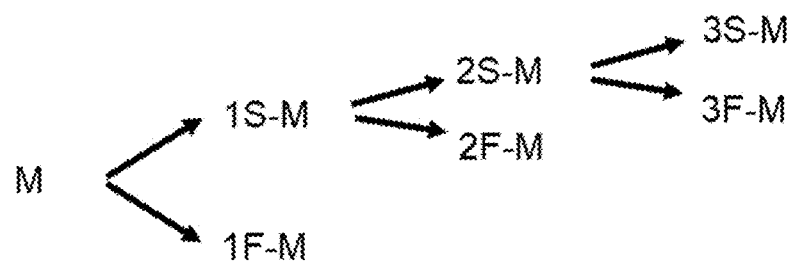
FIG. 2 shows embodiments of biomass residue being subjected to one or more separation steps, where (a) shows an embodiment where fresh liquid manure (M) is subjected to three separation steps indicated by arrows, and (b) shows an embodiment where a degassed biomass (DB) is subjected to three separation steps indicated by arrows.

FIG. 2 shows embodiments of biomass residue being subjected to one or more separation steps. FIG. 2a shows an embodiment where fresh liquid manure (M) is subjected to three separation steps as indicated by arrows. The manure is first exposed to a first separation, preferably a solid-liquid separation, where the manure is separated into a first solid manure fraction (1S-M) having a reduced content of liquid, and a first fluid manure fraction (1F-M) comprising mainly the free liquid having a low solid load content and optionally gaseous components. The first solid manure fraction (1S-M) is also referred to as a fibrous solid material, and the first fluid manure fraction (1F-M) is also referred to as reject liquid.

The first solid manure fraction (1S-M) may be exposed to a second separation step, preferably a solid-liquid separation, where the 1S-M is further separated into a second solid manure fraction (2S-M) having a further reduced content of liquid, and a second fluid manure fraction (2F-M) comprising mainly the free liquid having a low solid load content and optionally gaseous components. Preferably, the second separation is a solid-liquid separation, and more preferably a dewatering step, where free water is separated from the solid fraction or the fibrous material.

Preferably, the manure is subjected to two separation steps.

Optionally, the second solid manure biomass fraction (2S-M) may be exposed to a third separation step, where the 2S-M is further separated into a third solid fibrous manure fraction (3S-M) having a further reduced content of liquid, and a third fluid manure fraction (3F-M) comprising mainly the free liquid having a low solid load content and optionally gaseous $NH_3$ components. Preferably, the third separation is a drying step, where free water mainly as steam or in the vapour state is separated from the solid fraction or the fibrous material.

The obtained fluid fractions of the manure (i.e. 1F-M, 2F-M, 3F-M), and preferably the first fluid fraction (1F-M) and/or the second fluid fraction (2F-M), may be suitable as fertilizer or soil improver upon pH regulation. The pH regulator may be added to the fresh manure, or to any of the obtained separated fractions, and any combinations thereof. For example, the pH regulator may be added to fresh manure, and/or the first solid fraction (1S-M), and/or the second solid fraction (2S-M), and/or the first fluid fraction (1F-M), and/or the second fluid fraction (2F-M). More simple and efficient pH regulation may be obtained if the pH regulator is added to only one fraction, such as the fresh manure (M), or the first solid fraction (1S-M), or the first fluid fraction (1F-M).

In an embodiment of the disclosure, the biomass is fresh liquid manure, and the method comprises the steps of:
  exposing the manure (M) to a first separation step, wherein said manure is separated into a first solid manure fraction (1S-M) having a reduced content of water, and a first fluid manure fraction (1F-M),
  exposing the first solid manure fraction (1S-M) to a second separation step, wherein said solid manure (1S-M) is separated into a second solid manure fraction (2S-M) having a reduced content of water, and a second fluid manure fraction (2F-M), and
b. wherein the pH regulator is added to the fresh manure, and/or the first solid fraction (1S-M), and/or the first fluid fraction (1F-M).

In a preferred embodiment, the pH regulator is added to the fresh manure, or the first solid fraction (1S-M), or the first fluid fraction (1F-M).

Figure 2B:
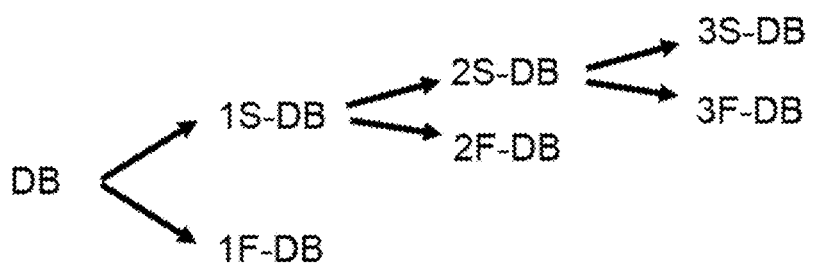

FIG. 2b shows an embodiment, where a degassed biomass (DB) is subjected to three separation steps, as indicated by the arrows. The degassed biomass (DB) is first exposed to a first separation step, preferably a solid-liquid separation, where the DB is separated into a first solid degassed biomass fraction (1S-DB) having a reduced content of liquid, and a first fluid degas sed biomass fraction (1F-DB) comprising mainly the free liquid having a low solid load content and optionally gaseous components. The first solid degassed biomass fraction (1S-DB) is also referred to as fibrous solid material, and the first fluid degassed biomass fraction (1F-DB) is also referred to as reject liquid.

The first solid degassed biomass fraction (1S-DB) may be exposed to a second separation step, preferably a solid-liquid separation, where the 1S-DB is further separated into a second solid degassed biomass fraction (2S-DB) having a further reduced content of liquid, and a second fluid degassed biomass fraction (2F-DB) comprising mainly the free liquid having a low solid load content and optionally gaseous components. Preferably, the second separation step is a solid-liquid separation step, such as a dewatering step, where free water is separated from the solid fraction or the fibrous material.

The second solid degassed biomass fraction (2S-DB) may be exposed to a third separation step, where the 2S-DB is further separated into a third solid degassed biomass fraction (3S-DB) having a further reduced content of liquid, and a third fluid degassed biomass fraction (3F-DB) comprising mainly the free liquid having a low solid load content and optionally gaseous components. Preferably, the third separation is a drying step, where free water mainly as steam or in the vapour state is separated from the solid fraction or the fibrous material.

The obtained fluid fractions of the degassed biomass (i.e. 1F-DB, 2F-DB, 3F-DB), and especially the first fluid fraction (1F-DB), may be surprisingly efficient as fertilizer or soil improver upon pH regulation. The obtained solid fractions of the degassed biomass (i.e. 1S-DB, 2S-DB, 3S-DB) may be surprisingly efficient for cultivating plants and/or fungal cells/spores upon pH regulation, e.g. when the solid fractions or the fibrous solid material is contacted with one or more species of Basidiomycete cells or spores and upon cultivating said Basidiomycete cells or spores in said fibrous solid substrate.

The pH regulator may be added to the degassed biomass (DB), or to any of the obtained separated fractions, and any combinations thereof. For example, the pH regulator may be added to the degassed biomass (DB), and/or the first solid fraction (1S-DB), and/or the second solid fraction (2S-DB), and/or the third solid fraction (3S-DB), and/or the first fluid fraction (1F-DB), and/or the second fluid fraction (2F-DB), and/or the third fluid fraction (3F-DB).

More simple and efficient pH regulation may be obtained if the pH regulator is added to only one or two fraction(s), such as the degassed biomass (DB), or the first fluid fraction (1F-DB), or the first solid fraction (1S-DB), or the second solid fraction (2S-DB), or the third solid fraction (3S-DB), or a combination of two of said fractions.

In an embodiment of the disclosure, the biomass is degassed biomass, and the method comprises the steps of:
a. exposing the DB to a first separation step, wherein said DB is separated into a first solid degassed biomass fraction (1S-DB) having a reduced content of water, and a first fluid degassed biomass fraction (1F-DB),
b. exposing the first solid degassed biomass fraction (1S-DB) to a second separation step, wherein said first solid fraction (1S-DB) is separated into a second solid degassed biomass fraction (2S-DB) having a reduced content of water, and a second fluid degassed biomass fraction (2F-DB),
c. exposing the second solid degassed biomass fraction (2S-DB) to a third separation step, wherein said second solid fraction (2S-DB) is separated into a third solid degassed biomass fraction (3S-DB) having a reduced content of water, and a third fluid degassed biomass fraction (3F-DB), and
d. wherein the pH regulator is added to the degas sed biomass (DB), and/or the first solid fraction (1S-DB), and/or the second solid fraction (2S-DB), and/or the third solid fraction (3S-DB), and/or the first fluid fraction (1F-DB), and/or the second fluid fraction (2F-DB), and/or the third fluid fraction (3F-DB).

In a further embodiment, the pH regulator is added to the degassed biomass (DB), or the first fluid fraction (1F-DB), or the first solid fraction (1S-DB), or the second solid fraction (2S-DB), or the third solid fraction (3S-DB), or a combination of two of said fractions.

The number of solid-fluid separations steps and the separation method will influence on the dry matter content, water content, and nutrients content of the resulting solid fractions and fluid fractions. For a fluid fraction to be efficiently used as fertilizer/soil improver on agriculture fields, then easy disposal as liquid fertilizer requires a low dry matter content, high water content, and high N, P, K values are advantageous. Further, it is especially advantageous that the nitrogen present in the fluid fraction, is retained in the liquid fertilizer upon disposal and distribution at the field. For a solid fraction to be efficiently used as growth substrate, it is advantageous that the total dry matter content of the substrates is sufficient such that it enables growth to e.g. roots, as well as facilitates distribution of water and other nutrients to e.g. the roots, and e.g. a high sulfur or sulphur content may be advantageous. For example, it may be advantageous that the dry matter content is between 25-85 wt %, preferably 30-70 wt % or 40-60 wt %.

It is further advantageous that the substrate has a low water content during storage to avoid degradation, and first when contacting the fibrous solid material with one or more species of Basidiomycete cells or spores and cultivating said Basidiomycete cells or spores in said fibrous solid substrate, water is added.

Efficient liquid fertilizers and efficient growth substrates may be obtained by subjecting biomass residue, e.g. degassed biomass or fresh biomass, to more than one separation step. Advantageously, the separation steps include dewatering and/or drying steps, such as two dewatering steps and optionally a drying step. Further suitable separation steps providing fractions with desired dry matter content, water content, and nutrients may be obtained by separation steps including screening, centrifuging, filter pressing, screw pressing, single screw pressing, twin screw pressing, drying, and combinations thereof, and preferably is a combination of twin screw pressing and drying.

Preferably, fresh manure is subjected to two separation steps, and further preferably the two separation steps are dewatering steps obtained by twin screw pressing, and the resulting liquid (2F-M) is preferably used as fertilizer.

Also, preferably, degassed biomass is subjected to three separation steps, and further preferably the first and second separation steps are dewatering by twin screw pressing, and the third separation is a drying step. The resulting solid fractions are preferably used as bedding (1S-DB) or as growth substrate (3S-DB), and the resulting liquid fractions are preferably used as fertilizer (1F-DB) or gas absorption medium (3F-DB).

In an embodiment of the disclosure, the one or more separations steps are solid-fluid separations, such as dewatering and/or drying.

In a further embodiment, the one or more separations steps are obtained by screening, centrifuging, filter pressing, screw pressing, single screw pressing, twin screw pressing, drying, and combinations thereof, and preferably is a combination of twin screw pressing and drying.

In an embodiment of the disclosure, the one or more separation steps are adapted to provide a biomass fraction with a dry matter content of 25-85 wt %, preferably 30-70 wt % or 40-60 wt %.

pH Regulation

Degassed biomass obtained directly from an anaerobic fermenter typically has a dry matter content of 6-8 wt % and a pH of about 7.5-9, cf. Example 1. Similarly, liquid cattle manure typically have a pH of 7.0, cf. Example 1.

The high pH is maintained during the first separation, and the resulting first solid degassed biomass fraction (1S-DB) typically has a pH of 7.5-9.0 and the resulting first fluid degassed biomass fraction (1F-DB) typically has a pH of above 7.5. In addition, the 1F-DB will typically have a high concentration of $NH_3$. The similar pH pattern applies to manure.

Figure 3:
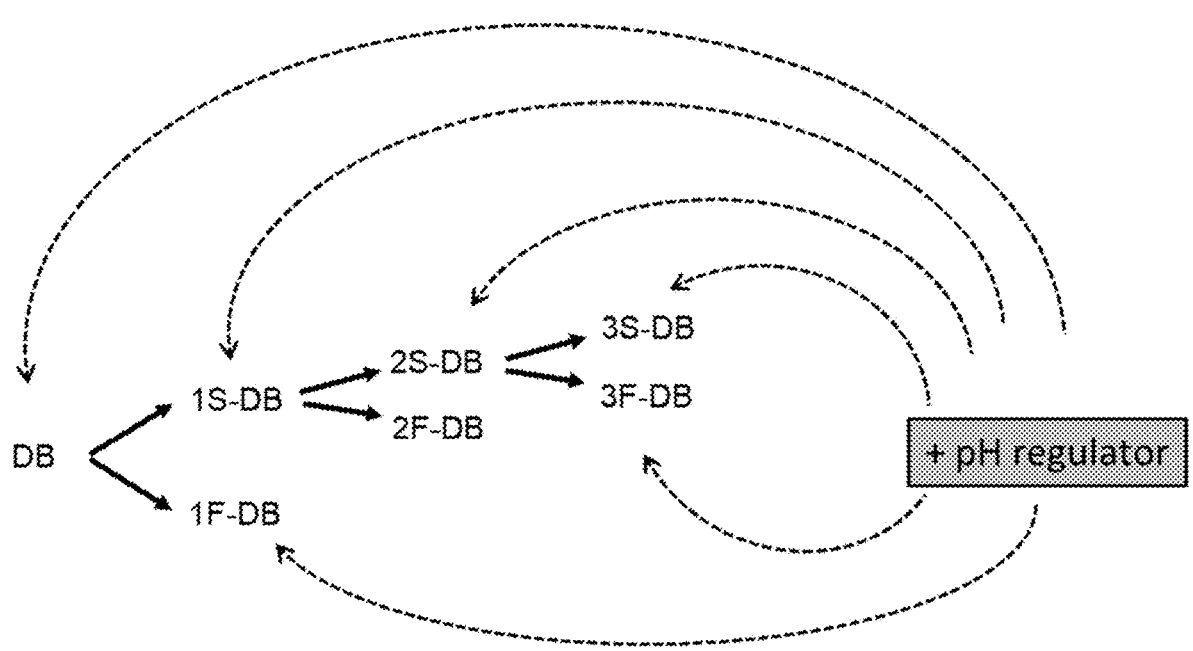
FIG. 3 shows an embodiment of the addition of pH regulator to degassed biomass before and/or during and/or after the separation steps.

As described above, the pH of the biomass residue or one or more of the fractions is advantageously regulated, and a pH regulator may be added to one or more of the fractions. FIG. 3 shows an embodiment of addition of pH regulator to degassed biomass subjected to three separation steps, where the preferred fractions added with pH regulator, is indicated by dot-and dash arrows.

As also described above, simple and efficient pH regulation is advantageously obtained by adding pH regulator to only one or two fractions. For example, the pH regulation may be added to the degassed biomass (DB), and the regulated pH may be maintained during the subsequent separation steps. Thus, for example, to produce a pH regulated substrate for cultivating mushrooms, the pH regulator may be either added to the degassed biomass (DB), or to final, ready-to-use fibrous solid substrate (3S-DB).

A pH regulator typically acts by adjusting the pH of the liquid parts of the biomass. Thus, more efficient and stable pH regulation may be obtained, when the pH regulator has been added to a biomass or biomass fraction comprising a suitable amount of liquid parts. Correspondingly, the pH regulator is advantageously added to a biomass or biomass fraction comprising a suitable dry matter content.

In a further, or alternative, embodiment of the disclosure, the pH regulator is added to biomass comprising a liquid part of 10-50 wt %, more preferably 15-40 wt % or 20-30 wt %.

In a further embodiment, the pH regulator is added to biomass comprising a dry matter content of 25-85 wt %, more preferably 30-70 wt % or 40-60 wt %.

The addition of pH regulator to different fractions and the stability of the pH during subsequent separation steps are further described in Examples 2 (for cattle manure), 3 (for degassed biomass), 4 (for gas absorption), and 5 (for mushroom substrate). The tests have been carried out at the AST Demo plant at AU-Foulum.

Eco Organic Acids

Chemical additives, such as $H_2SO_4$, are conventionally used as pH regulators. For example, sulfuric acid may be added to liquid manure before it is used as fertilizer to reduce the content of gaseous $NH_3$. However, chemical additives are not compatible with eco-friendly farming, and the production of ecological and organic food products.

The present disclosure provides an alternative to chemical additives, which are compatible with eco-friendly farming and the production of ecological and organic food products. The inventors surprisingly found that the pH may be efficiently adjusted by use of one or more organic acid(s). By the term "organic acid" or "eco organic acid" is meant an acid, which is produced in an eco-friendly manner.

Examples of organic acids according to the present disclosure are grass juice and processed grass juices, such as ensiled grass, grass silage, or grass silage juice, as well as other ensiled plant materials or ensiled agricultural biomass. Ensiled biomass, such as grass silage, or juices derived from ensiled straw, comprises organic acids and typically have a pH of below 6. Ensiled biomass comprises a liquid fraction, also referred to as the juice, when extracted or separated. For example, the liquid fraction of ensiled grass is grass silage juice. Hence, by the term "juice" is meant a liquid derived from the pressing of a biological material including cells or tissues, such as a plant, fruit, grass, or fish manure, whereby the liquid part of the biological material (i.e. the fruit, grass, fish) is extracted and released as juice. Due to the biological origin and processing of a juice, a juice inherently is a liquid comprising organic derived materials and components. In contrast, organic derived components are not present in chemical additives which is industrially produced and not derived from a pressing process, Another example of an organic acid is fish manure derived from fish farming, and particularly fish farming on land, where also the nutrients from the fish feed/fodder may be recovered within the manure. Example 6 describes an embodiment, where fish manure is used as pH regulator.

In a preferred embodiment of the disclosure, the pH regulator comprises one or more organic acid(s). In a further embodiment, the pH regulator comprises a juice derived from agricultural biomass, such as a juice derived from a plant material, or ensiled agricultural biomass. In a further embodiment, the pH regulator comprises a juice derived from grass and/or ensiled biomass. In a further embodiment, the pH regulator comprises a juice derived from ensiled straw.

Figure 4:
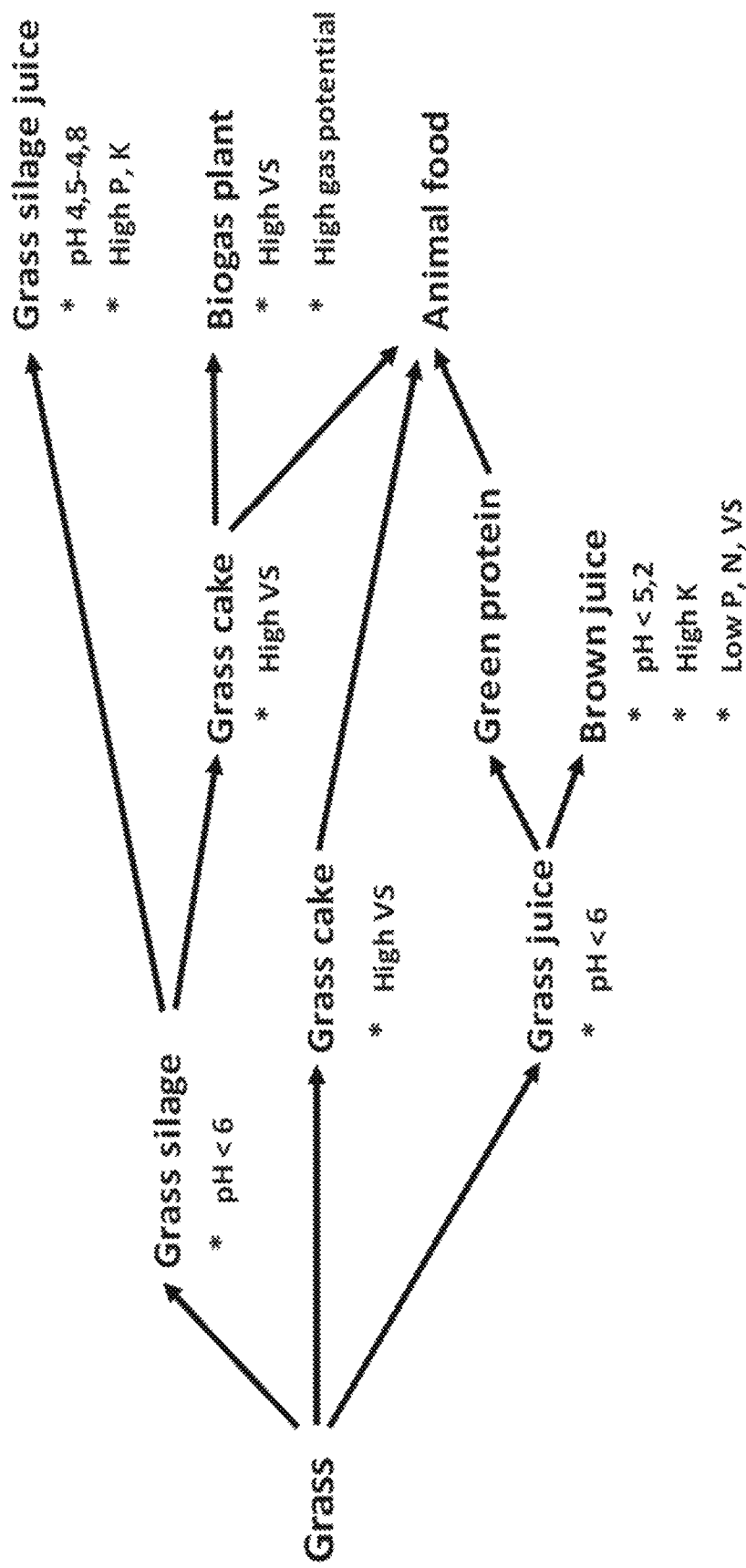
FIG. 4 shows an embodiment of the processes for obtaining grass juice and processed grass juices.

FIG. 4 shows an embodiment of the processes for obtaining grass juice and various processed grass juices. The harvested grass biomass may be exposed to a first solid-liquid separation, where the biomass is separated, e.g. pressed, into a grass juice and a residual solid grass cake, which may be used as feedstock for a biogas plant or as animal fodder. The obtained grass juice will have a pH below 6.

Alternatively, the harvested grass biomass may be processed into processed grass juice by fermenting the grass into a grass silage, and subsequently separating the grass silage into a grass cake and grass silage juice. Both the grass silage, and the grass silage juice will have a pH below 6, such as between 4.5-4.8 or 4.5-5.5 and may further comprise a significant amount of nutrients especially P and K.

Grass juice may further be processed into green protein and a residual called brown juice. Green proteins may be used in the production of edible foods and may be an important protein source in the shift from "meat based meals" to "plant based meals". In contrast, brown juice is considered a low value residue, and it is typically disposed of. The brown juice has a pH below 5.5, such as below 5.2, and may further comprise a significant amount of nutrients especially K.

The cultivation and harvesting of grass is particularly compatible with eco-friendly farming. Grass is a vegetation that has a long growing season, is productive for multiple years, regulates the growth of weed, protects ground water and surface waters (streams, rivers, lakes, fjords, seas), and further acts as a soil conditioner and ecological fertilizer. The latter is due to the ability of grass to capture nitrogen from the air, and thus creating a nutrient storage of nitrogen within the soil. Thus, grass is considered a N-fertilizer source in ecological farming. In addition to capturing nitrogen, grass may capture other nutrients during growth, and thus grass land has the effect of protecting the ground water and surface waters if the grass in harvested, collected, processed and finally used as biomass in biogas and biofertilizer production.

Figure 5:
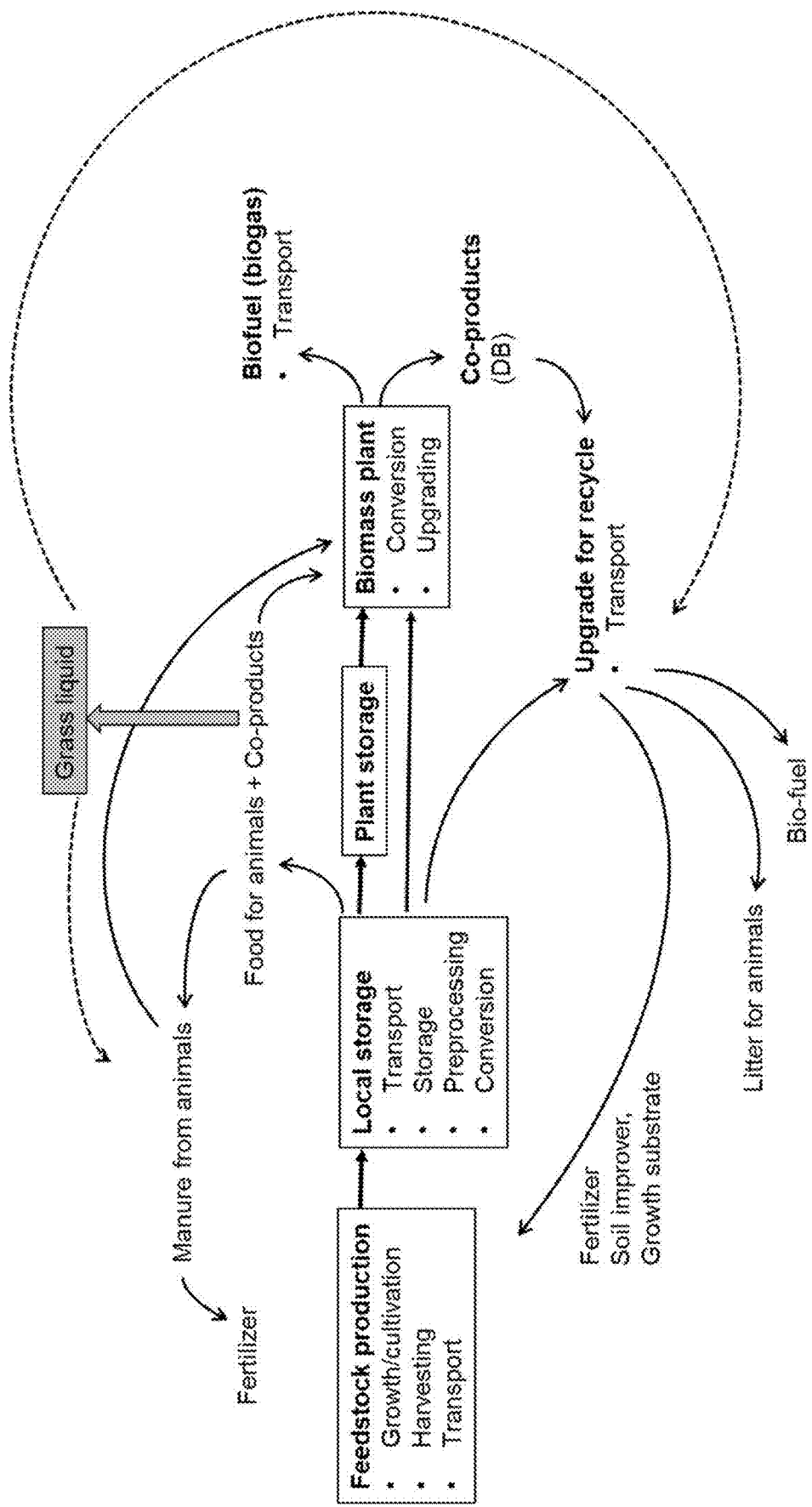
FIG. 5 shows an embodiment of a biomass life cycle including use of grass juice and processed grass juice for upgrading the degassed biomass.

FIG. 5 shows an embodiment of a biomass life cycle including use of grass juice and processed grass juice for upgrading the degassed biomass. The use of grass juice and processed grass juice surprisingly increases the biomass exploitation efficiency.

The production of edible products is regulated for health and safety reasons. To reduce the risk of detrimental components originating from the liquid derived from grass, the pH regulator is advantageously a processed grass juice, such as grass silage, grass silage juice, or brown juice. Particularly for production of growth substrates it may be necessary to use processed grass juice.

In an embodiment of the disclosure, the juice derived from grass is selected from the group of grass juice and processed grass juice, such as grass silage, grass silage juice, and/or brown juice, and preferably is processed grass juice, most preferably grass silage.

Juice derived from grass is surprisingly found to be an efficient and stable pH regulator, when using juice having a suitable amount of lactic acid.

In an embodiment of the disclosure, the juice derived from grass comprises lactic acid in a concentration between 0.3-12 wt %, more preferably 0.4-10 wt %, or 0.5-5 wt %, or 0.5-2 wt %.

The juice derived from grass was further surprisingly found to be a cost-efficient regulator, since stable and regulated pH may be obtained using small amounts of regulator relative to the amount of biomass.

In a further embodiment, the amount of pH regulator added to the biomass is between 10-60 wt %, more preferably 25-50 wt % or 30-40 wt %.

In a further embodiment, the amount of pH regulator added to the biomass is adapted to provide a solid biomass fraction having a pH of between 5-8, more preferably between 5.5-7.5, and most preferably between 6.0-7.0.

In a further embodiment, the amount of pH regulator added to the biomass is adapted to provide a fluid biomass fraction having a pH equal to or below 7, more preferably between 5.0-6.5, and most preferably between 5.5-6.0.

Sustainability

The cultivation and harvesting of grass further facilitate increased focus on local and sustainable production and exploitation of biomass. For example, a local farm cultivating grass may advantageously have a local storage of grass, grass silage, grass silage juice, or grass juice, as illustrated in FIG. 4.

The locally produced grass, grass silage, grass silage juice, or grass juice may then be used for local fertilization, when needed. The juice derived from grass acts as a pH regulator, and thereby reduces the ammonia evaporation from a fertilizer. For example, the fertilizer may be locally produced manure from animals, such as the liquid fraction of the manure after a solid-liquid separation. Thus, the juice provides a more efficient use of the bio nutrients with a resulting higher crop yield. The fertilizer may also be a recycled product from the biomass processing plant, as illustrated in FIG. 4.

In addition, or alternatively, the locally produced grass silage juice may be used for moistening straw in connection with cutting before processing straw into silage to be used as feed stock for biomass plant with increased biogas production and added value of co-products for recycling, e.g. bio-fuel, as illustrated in FIG. 4.

The locally produced solid grass cakes may be used as food for animals, e.g. feed stuff for the local cattle, as illustrated in FIG. 4. Alternatively, the solid grass cakes may be transported to a biomass plant for producing biogas.

The cultivation and harvesting of grass further facilitate reduced transportation between local farms and the biomass plant. The transport will be more energy efficient compared to transport of bulk biomass, thus fewer truck loads are required. Also, full truck loads on return may be obtained if e.g. the local farm receives recycled co-products from the biomass plant, and then delivers biomass feedstock or pH regulator (e.g. grass silage) on return.

EXAMPLES

The invention is further described by the examples provided below.

Example 1: Juice Derived from Grass

Fresh cut grass was harvested, and the harvested grass biomass was processed as sketched in FIG. 4: First, the harvested grass biomass was exposed to a first solid-liquid separation using a twin press, where the biomass was separated into a grass juice and a residual solid grass cake. The grass juice was subsequently fermented into grass silage, and the grass silage subsequently separated into grass cake and grass silage juice using a twin press. Part of the grass was also processed into green protein and brown juice.

Table 1 summarizes the characteristics of the different juices derived from the grass and the solid grass cakes.

Table 1. Characteristics, in the form of pH, nutrient contents (total nitrogen ("$N_{total}$"), ammonium $NH_4^+$ ("Amm-N"), phosphorus (P), potassium (K), sulphur (S)), and lactic acid content, dry matter content ("TS"), volatile solids of the dry matter content ("VS of TS") of the different juices derived from the grass and the solid grass cakes. For comparison, data for degassed biomass and fresh liquid cattle manure is included. Also included are juice derived from fish manure, where the reject water from a closed aquaculture system has been sedimented, and juice derived from said sediment.

TABLE 1

| Type | Quality | TS | VS of TS | $N_{total}$ | Amm-N | P | K | S | Lactid acid kg per ton | pH | Test-doc | Source |
|---|---|---|---|---|---|---|---|---|---|---|---|---|
| | | | | Nutrients in kg per ton | | | | | | | | |
| Grass silage | GS1 | 27.8% | 84.5% | 4.12 | 0.60 | 0.42 | 1.68 | 0.71 | 3.9 | 4.8 | 1479238 | oK-Lab |
| Juice after twin press | JGS1 | 5.2% | 64.4% | 2.84 | 1.10 | 0.46 | 1.89 | 0.43 | | 4.9 | 1479237 | oK-Lab |

TABLE 1-continued

| Type | Quality | TS | VS of TS | $N_{total}$ | Amm-N | P | K | S | Lactid acid kg per ton | pH | Test-doc | Source |
|---|---|---|---|---|---|---|---|---|---|---|---|---|
| Cake after twin press | CGS1 | 48.6% | 90.3% | 6.78 | 0.54 | 0.40 | 1.34 | 0.79 | | 5.0 | 1479236 | oK-Lab |
| Grass silage | GS2 | 33.1% | 91.5% | 6.93 | 0.79 | 0.63 | 5.11 | 0.51 | | 4.8 | 1479296 | oK-Lab |
| Juice after twin press | JGS2 | 6.7% | 72.9% | 4.30 | 1.39 | 0.64 | 5.06 | 0.30 | | 5.1 | 1479295 | oK-Lab |
| Cake after twin press | CGS2 | 46.3% | 91.4% | 10.76 | 0.92 | 0.71 | 4.00 | 0.89 | | 5.6 | 1479294 | oK-Lab |
| Fresh cuttet grass | GF | 20.6% | 91.3% | 3.99 | 0.02 | 0.49 | 4.03 | 0.30 | | 5.1 | 1479248 | oK-Lab |
| Juice after twin press | JGF | 7.8% | 83.8% | 1.74 | 0.17 | 0.36 | 3.80 | 0.21 | | 4.5 | 1479295 | oK-Lab |
| Cake after twin press Green protein | CGF | 40.0% | 94.6% | 6.75 | 0.17 | 0.64 | 3.88 | 0.39 | | 4.6 | 1479249 | oK-Lab |
| Brown juice Aquaculture (closed systems) | BJGP | 4.4% | 75.1% | 0.80 | 0.00 | 0.19 | 3.00 | 0.11 | 12.5 | 4.8 | Info | AU-Foulum |
| Juice from sediment | JAS | 6.4% | 70.8% | 4.33 | 1.08 | 1.58 | 0.17 | 0.32 | | 5.7 | 1476036 | oK-Lab |
| Degassed biomass | DB | 8.0% | 70% | 5.20 | 3.82 | 1.01 | 4.50 | 0.40 | | 8.5 | Info | AU-Foulum |
| Liquid cattle manure | M | 7.50% | 80% | 5.50 | 3.30 | 0.80 | 2.20 | 0.50 | | 7.2 | Info | AU-Foulum |

It is seen that the pH of the fresh cut grass was measured to be 5.1, and that the pH of the separated fresh cut grass was respectively 4.5 for the resulting grass juice, and 4.6 for the resulting solid grass cake.

Two grass silage was tested. For both samples, the pH of the grass silage was 4.8 (cf. Table 1). After separating the grass silage using a twin press, the pH of the resulting grass silage juice was 4.9 and 5.1, and the pH of the resulting silage cake was 5.0 and 5.6.

Grass juice was also processed into green protein and brown juice, and the resulting brown juice was measured to have a pH of about 4.8.

Example 2: pH Regulating Liquid Cattle Manure

Fresh liquid cattle manure was subjected to two solid-liquid separations, as illustrated in FIG. 2a, and where pH regulator in the form of grass silage juice (JGS2) with a pH of about 5.1 or grass silage (GS1) with a pH of about 4.8, was added to respectively the fresh cattle manure, or different fractions of the separated manure (1S-M), as illustrated in FIG. 3.

Table 2 summarizes the characteristics (i.e. pH, nutrient contents (i.e. total nitrogen, ammonium $NH_4+$("Amm-N"), phosphorus (P), potassium (K), sulphur (S)) of the fresh liquid cattle manure, and after it is subjected to the first and second solid-liquid separation, as illustrated in FIG. 2a.

It is seen that the pH of the fresh cattle manure is about 7.2. The pH remains essentially the same during the subsequent separation steps.

It is further seen that by subjecting the liquid cattle manure to two solid-liquid separations, biomass fractions with higher energy density and added value are obtained. For example, it is seen that the two step separation make it possible to:
Transfer+50% of the energy potential in liquid cattle manure in <8% of the total quantity as fiber fraction 2S-M as biogas feed stock with +120 $m^3CH_4$ per ton.
Increase the $NH_4±/N$ ratio from 60% to +70% in the liquid 1F-M fraction.

Table 3 summarizes the characteristics of liquid cattle manure subjected to the first and second solid-liquid separation, as illustrated in FIG. 2a, where grass silage juice ("pH regulator, JGS2") with a pH of about 5.1 was added to the fresh cattle manure (M). To a quantity (Q) of 1000 tonne liquid cattle manure, a quantity of 500 tonne pH regulator (50 wt %) was added.

It is seen that the pH regulator makes it possible to reduce and regulate the pH, and further makes it possible to:
Transfer+50% of the energy potential as fiber fraction (2S-M) in 7% of the total quantity.
Increase the $NH_4±/N$ ratio from 60% in M to 68% in 1F-M.
Increase the N/P ration from 6,9 in M to 12,9 in 1F-M.
obtain a valuable liquid organic fertilizer 2F-M+ goal directed for use in ecological farming.

Table 4 summarizes the characteristics of liquid cattle manure subjected to the first and second solid-liquid separation, as illustrated in FIG. 2a, where grass silage juice ("pH regulator, JGS2") was added to the first solid fraction (1S-M). It is seen that the pH regulator makes it possible to reduce and regulate the pH, and further makes it possible to:
Transfer+56% of the energy potential as fiber fraction (2S-M) in <8% of the total quantity.
Increase the $NH_4±/N$ ratio from 60% in M to 77% in 1F-M.
Obtain a valuable liquid organic fertilizer 2F-M+ goal directed for use in ecological farming.

Table 5 also summarizes the characteristics of liquid cattle manure subjected to the first and second solid-liquid separation, as illustrated in FIG. 2a, where grass silage ("pH regulator, GS1") with a pH of about 4.8 was added to the first solid fraction. It is seen that the pH regulator makes it possible to reduce and regulate the pH, and further makes it possible to:

Transfer+69% of the energy potential as fiber fraction (2S-M) in <14% of the total quantity.

Increase the $NH_4+/N$ ratio from 60% in M to 77% in 1F-M.

Obtain a valuable liquid organic fertilizer 2F-M+ goal directed for use in ecological farming.

Hence, addition of the pH regulator to either fresh liquid manure, or separated liquid manure, facilitates:

Increase of the N/P ratio from 6,9 in (M) to 12,9 in the liquid 1F-M fraction.

Production of valuable liquid organic fertilizer 2F-M+ goal directed for ecological farming.

Table 2. Characteristics of liquid cattle manure subjected to the first and second solid-liquid separation, as illustrated in FIG. 2a.

Table 3. Characteristics of liquid cattle manure subjected to the first and second solid-liquid separation, as illustrated in FIG. 2a, where grass silage juice ("pH regulator, JGS2") was added to the fresh cattle manure (M).

Table 4. Characteristics of liquid cattle manure subjected to the first and second solid-liquid separation, as illustrated in FIG. 2a, where grass silage juice ("pH regulator, JGS2") was added to the first solid fraction (1S-M).

Table 5. Characteristics of liquid cattle manure subjected to the first and second solid-liquid separation, as illustrated in FIG. 2a, where grass silage ("pH regulator, GS1") was added to the first solid fraction (1S-M).

TABLE 2

| | | TS | VS | Nutrients in ton | | | | | Q | | | |
| | | ton | ton | $N_{total}$ | Amm-N | P | K | S | ton | pH | Test-doc | Source |
|---|---|---|---|---|---|---|---|---|---|---|---|---|
| Liquid cattle manure | M | 75.0 | 60.0 | 5.50 | 3.30 | 0.80 | 2.20 | 0.50 | 1000 | 7.2 | Info | AU-Foulum |
| | | 7.5% | 80% | 5.50 | 3.30 | 0.80 | 2.20 | 0.50 kg/ton | | | | |
| 1st separation | 1S-M | 37.5 | 35.1 | 1.60 | 0.31 | 0.31 | 0.32 | 0.15 | 125 | | Estimate | AST |
| | | 30% | 94% | 12.78 | 2.50 | 2.49 | 2.53 | 1.16 kg/ton | | | | |
| | 1F-M | 37.5 | 24.9 | 3.90 | 2.99 | 0.49 | 1.88 | 0.35 | 875 | | Estimate | AST |
| | | 4.3% | 67% | 4.46 | 3.41 | 0.56 | 2.15 | 0.41 kg/ton | | | | |
| 2nd separation | 2S-M | 35.6 | 33.8 | 1.40 | 0.16 | 0.29 | 0.22 | 0.13 | 79 | | Estimate | AST |
| | | 45% | 95% | 17.64 | 1.96 | 3.61 | 2.74 | 1.60 kg/ton | | | | |
| | 2F-M | 1.9 | 1.2 | 0.20 | 0.16 | 0.02 | 0.10 | 0.02 | 46 | | Estimate | AST |
| | | 4.1% | 65% | 4.40 | 3.42 | 0.54 | 2.15 | 0.40 kg/ton | | | | |
| Table 2. Two step separation on liquid cattle manure without pH regulator | | | | | | | | | | | | |
| Fiber fraction | 2S-M | % of | 56.4% | 25.4% | 4.7% | 35.7% | 9.9% | 25.4% | 7.9% | | | |
| Liquid fraction | 1F-M | total | 41.6% | 70.9% | 90.5% | 61.2% | 85.6% | 70.9% | 87.5% | | | |
| | 2F-M | | 2.0% | 3.7% | 4.8% | 3.1% | 4.5% | 3.7% | 4.6% | | | |

TABLE 3

| | | TS | VS | Nutrients in ton | | | | | Q | | | |
| | | ton | ton | $N_{total}$ | Amm-N | P | K | S | ton | pH | Test-doc | Source |
|---|---|---|---|---|---|---|---|---|---|---|---|---|
| Liquid cattle manure | M | 75.0 | 60.0 | 5.50 | 3.30 | 0.80 | 2.20 | 0.50 | 1000 | 7.2 | Info | AU-Foulum |
| | | 7.5% | 80% | 5.50 | 3.30 | 0.80 | 2.20 | 0.50 kg/ton | | | | |
| pH regulator | JGS2 | 33.5 | 24.4 | 2.15 | 0.70 | 0.32 | 2.53 | 0.15 | 500 | 5.1 | 1479295 | oK-Lab |
| | | 6.7% | 73% | 4.30 | 1.39 | 0.64 | 5.06 | 0.30 kg/ton | | | | |
| | M+ | 108.6 | 85.2 | 7.65 | 4.00 | 1.12 | 4.73 | 0.65 | 1500 | | | |
| | | 7.2% | 78% | 5.10 | 2.68 | 0.75 | 3.15 | 0.43 kg/ton | | | | |
| 1st separation | 1S-M+ | 49.9 | 45.9 | 2.31 | 0.33 | 0.71 | 0.83 | 0.29 | 166 | | Estimate | AST |
| | | 30% | 92% | 13.85 | 2.01 | 4.26 | 4.98 | 1.76 kg/ton | | | | |
| | 1F-M+ | 58.6 | 39.3 | 5.34 | 3.66 | 0.41 | 3.90 | 0.36 | 1334 | | Estimate | AST |
| | | 4.4% | 67% | 4.01 | 2.74 | 0.31 | 2.92 | 0.27 kg/ton | | | | |
| 2nd separation | 2S-M+ | 47.2 | 44.2 | 2.06 | 0.17 | 0.37 | 0.42 | 0.15 | 105 | | Estimate | AST |
| | | 45% | 94% | 19.66 | 1.58 | 3.50 | 4.02 | 1.44 kg/ton | | | | |
| | 2F-M+ | 2.7 | 1.7 | 0.24 | 0.17 | 0.34 | 0.41 | 0.14 | 62 | | Estimate | AST |
| | | 4.5% | 63% | 3.94 | 2.74 | 5.56 | 6.62 | 2.30 kg/ton | | | | |
| Table 3. Two step separation on liquid cattle manure (M) + pH regulator grass silage juice (JGS2) added before separation | | | | | | | | | | | | |
| Fiber fraction | 2S-M+ | % of | 51.9% | 27.0% | 4.1% | 32.8% | 8.9% | 23.2% | 7.0% | | | |
| Liquid fraction | 1F-M+ | total | 46.1% | 69.9% | 91.6% | 36.6% | 82.5% | 55.0% | 88.9% | | | |
| | 2F-M+ | | 2.0% | 3.2% | 4.2% | 30.6% | 8.6% | 21.8% | 4.1% | | | |

TABLE 4

| | | TS ton | VS ton | Nutrients in ton | | | | | Q ton | pH | Test-doc | Source |
|---|---|---|---|---|---|---|---|---|---|---|---|---|
| | | | | $N_{total}$ | Amm-N | P | K | S | | | | |
| Liquid cattle manure | M | 75 | 60 | 5.50 | 3.30 | 0.80 | 2.20 | 0.50 | 1000 | 7.2 | Info | AU-foulum |
| | | 7.5% | 80% | 5.50 | 3.30 | 0.80 | 2.20 | 0.50 kg/ton | | | | |
| 1st separation | 1S-M | 37.5 | 35.3 | 1.60 | 0.31 | 0.31 | 0.32 | 0.15 | 125 | | Estimate | AST |
| | | 30% | 94% | 12.84 | 2.50 | 2.50 | 2.53 | 1.17 kg/ton | | | | |
| | 1F-M | 37.5 | 24.8 | 3.90 | 2.99 | 0.49 | 1.88 | 0.35 | 875 | | Estimate | AST |
| | | 4.3% | 66% | 4.45 | 3.41 | 0.56 | 2.15 | 0.40 kg/ton | | | | |
| pH regulator | JGS2 | 4.2 | 3.1 | 0.27 | 0.09 | 0.04 | 0.32 | 0.02 | 63 | 5.1 | 1479295 | oK-Lab |
| | | 6.7% | 73% | 4.30 | 1.39 | 0.64 | 5.06 | 0.30 kg/ton | | | | |
| | 1S-M+ | 41.7 | 38.3 | 1.87 | 0.40 | 0.35 | 0.63 | 0.16 | 188 | | | |
| | | 22% | 92% | 9.99 | 2.13 | 1.88 | 3.37 | 0.88 kg/ton | | | | |
| 2nd separation | 2S-M+ | 37.2 | 35.4 | 1.49 | 0.12 | 0.24 | 0.24 | 0.09 | 83 | | Estimate | AST |
| | | 45% | 95% | 18.00 | 1.51 | 2.90 | 2.86 | 1.11 kg/ton | | | | |
| | 2F-M+ | 4.5 | 2.9 | 0.39 | 0.27 | 0.11 | 0.40 | 0.07 | 105 | | Estimate | AST |
| | | 4.3% | 64% | 3.68 | 2.62 | 1.08 | 3.78 | 0.70 kg/ton | | | | |

Table 4. Two step separation on liquid cattle manure (M) + pH regulator grass silage juice (JGS2) added after 1st separation

| | | | | | | | | | |
|---|---|---|---|---|---|---|---|---|---|
| Fiber fraction | 2S-M+ | % of | 56.1% | 25.8% | 3.7% | 28.5% | 9.4% | 17.7% | 7.8% |
| liquid fraction | 1F-M | total | 39.3% | 67.5% | 88.2% | 58.1% | 74.9% | 68.3% | 82.4% |
| | 2F-M+ | | 4.6% | 6.7% | 8.1% | 13.5% | 15.8% | 14.1% | 9.9% |

TABLE 5

| | | TS ton | VS ton | Nutrients in ton | | | | | Q ton | pH | Test-doc | Source |
|---|---|---|---|---|---|---|---|---|---|---|---|---|
| | | | | $N_{total}$ | Amm-N | P | K | S | | | | |
| Liquid cattle manure | M | 75 | 60 | 5.50 | 3.30 | 0.80 | 2.20 | 0.50 | 1000 | 7.2 | Info | AU-Foulum |
| | | 7.5% | 80% | 5.50 | 3.30 | 0.80 | 2.20 | 0.50 kg/ton | | | | |
| 1st separation | 1S-M | 37.5 | 35.3 | 1.60 | 0.31 | 0.31 | 0.32 | 0.15 | 125.0 | | Estimate | AST |
| | | 30% | 94% | 12.84 | 2.50 | 2.50 | 2.53 | 1.17 kg/ton | | | | |
| | 1F-M | 37.5 | 24.8 | 3.90 | 2.99 | 0.49 | 1.88 | 0.35 | 875 | | Estimate | AST |
| | | 4.3% | 66% | 4.45 | 3.41 | 0.56 | 2.15 | 0.40 kg/ton | | | | |
| pH regulator | GS1 | 34.7 | 29.3 | 0.52 | 0.08 | 0.05 | 0.21 | 0.09 | 125.0 | 4.8 | 1479238 | oK-Lab |
| | | 27.8% | 85% | 4.12 | 0.60 | 0.42 | 1.68 | 0.71 kg/ton | | | | |
| | 1S-M+ | 72.2 | 64.6 | 2.12 | 0.39 | 0.36 | 0.53 | 0.23 | 250.0 | | | |
| | | 29% | 89% | 8.48 | 1.55 | 1.46 | 2.11 | 0.94 kg/ton | | | | |
| 2nd separation | 2S-M+ | 67.9 | 61.8 | 1.84 | 0.18 | 0.28 | 0.27 | 0.16 | 150.8 | | Estimate | AST |
| | | 45% | 91% | 12.18 | 1.20 | 1.84 | 1.80 | 1.03 kg/ton | | | | |
| | 2F-M+ | 4.3 | 2.8 | 0.28 | 0.21 | 0.09 | 0.26 | 0.08 | 99.2 | | Estimate | AST |
| | | 4.4% | 65% | 2.84 | 2.08 | 0.88 | 2.57 | 0.80 kg/ton | | | | |

Table 5. Two step separation on liquid cattle manure (M) + pH regulator grass silage (GS1) added after 1st separation

| | | | | | | | | | |
|---|---|---|---|---|---|---|---|---|---|
| Fiber fraction | 2S-M+ | % of | 69.1% | 30.6% | 5.4% | 32.5% | 11.3% | 26.4% | 13.4% |
| Liquid fraction | 1F-M | total | 27.7% | 64.8% | 88.5% | 57.2% | 78.2% | 60.1% | 77.8% |
| | 2F-M+ | | 3.1% | 4.7% | 6.1% | 10.2% | 10.6% | 13.4% | 8.8% |

Example 3: pH Regulating Degassed Biomass

Degassed biomass from an anaerobic fermenter was subjected to three solid-liquid separations, as illustrated in FIG. 2b, and pH regulator in the form of grass silage juice (JGS2), was added to different fractions of the separated degassed biomass, as illustrated in FIG. 3. To a quantity (Q) of 1000 tonne degassed biomass, a quantity of 300 tonne pH regulator (30 wt %) was added (Table 7), or 25 wt % (Table 8), or 50 wt % (Table 9).

Table 6 summarizes the characteristics (i.e. pH, nutrient contents (i.e. total nitrogen, ammonium $NH_4^+$ ("Amm-N"), phosphorus (P), potassium (K), sulphur (S)) of the fresh degassed biomass, and after it is subjected to the first, second, and third solid-liquid separation, as illustrated in FIG. 2b.

It is seen that the pH of the fresh degassed biomass is about 8.5. The pH remains essentially the same during the subsequent separation steps.

It is further seen that by subjecting the degassed biomass to three solid-liquid separations, biomass fractions with higher energy density and added value are obtained. For example, it is seen that the two-step separation makes it possible to:
- produce valuable substrate fiber 3S-DB out of degassed biomass DB.
- increase the $NH_4+/N$ ratio from 73% in DB to 86% in 1F-DB+2F-DB.
- increase the N/P ratio from 5,2 in DB to 6,7 in 1F-DB+2F-DB.
- produce a liquid amm-N fertilizer.

Table 7 summarizes the characteristics of degassed biomass subjected to the first, second and third solid-liquid separation, as illustrated in FIG. 2b, where grass silage juice ("pH regulator, JGS2") with a pH of about 5.1 was added to the fresh degassed biomass (DB) in an amount of 30 wt %. It is seen that the pH regulator makes it possible to reduce and regulate the pH, and further makes it possible to:
- produce valuable substrate fiber 3S-DB out of degassed biomass DB.
- increase the $NH_4+/N$ ratio from 73% in DB to 80% in 1F-DB+2F-DB.
- increase the N/P ratio from 5,2 in DB to 11,1 in 1F-DB+.
- make valuable liquid organic fertilizer goal directed for use in ecological farming—2F-DB+ and 3F-DB+.

Table 8 summarizes the characteristics of degassed biomass subjected to the first, second and third solid-liquid separation, as illustrated in FIG. 2b, where grass silage juice ("pH regulator, JGS2") with a pH of about 5.1 was added to the first solid fraction (1S-DB) in an amount of 25 wt %. It is seen that the pH regulator makes it possible to reduce and regulate the pH, and further makes it possible to:
- produce valuable substrate fiber 3S-DB out of degassed biomass DB.
- increase the $NH_4\pm/N$ ratio from 73% in DB to 86% in 1F-DB+.
- make valuable liquid organic fertilizer goal directed for use in ecological farming—2F-DB+ and 3F-DB+.

Table 9 summarizes the characteristics of degassed biomass subjected to the first, second and third solid-liquid separation, as illustrated in FIG. 2b, where grass silage juice ("pH regulator, JGS2") with a pH of about 5.1 was added to the second solid fraction (2S-DB) in an amount of 50 wt %. It is seen that the pH regulator makes it possible to reduce and regulate the pH, and further makes it possible to:
- produce valuable substrate fiber 3S-DB out of degassed biomass DB.
- increase the $NH_4\pm/N$ ratio from 73% in DB to 86% in 1F-DB+.
- make valuable liquid organic fertilizer goal directed for use in ecological farming—2F-DB+ and 3F-DB+.

Table 6. Characteristics of degassed biomass subjected to the first, second and third solid-liquid separation, as illustrated in FIG. 2b.

Table 7. Characteristics of degassed biomass subjected to the first, second and third solid-liquid separation, as illustrated in FIG. 2b, where grass silage juice ("pH regulator, JGS2") was added to the fresh degassed biomass.

Table 8. Characteristics of degassed biomass subjected to the first, second and third solid-liquid separation, as illustrated in FIG. 2b, where grass silage juice ("pH regulator, JGS2") was added to the first solid fraction (1S-DB).

Table 9. Characteristics of degassed biomass subjected to the first, second and third solid-liquid separation, as illustrated in FIG. 2b, where grass silage juice ("pH regulator, JGS2") was added to the second solid fraction (2S-DB).

TABLE 6

| | | TS | VS | Nutrients in ton | | | | | Q | | | |
| | | ton | ton | $N_{total}$ | Amm-N | P | K | S | ton | pH | Test-doc | |
|---|---|---|---|---|---|---|---|---|---|---|---|---|
| Degassed biomass | DB | 80.0 | 56.0 | 5.20 | 3.82 | 1.01 | 4.50 | 0.40 | 1000 | 8.5 | Info | AU-Foulum |
| | | 8.0% | 70% | 5.20 | 3.82 | 1.01 | 4.50 | 0.40 | | | | |
| | | | | | | | | kg/ton | | | | |
| 1st separation | 1S-DB | 40.8 | 33.5 | 1.22 | 0.40 | 0.40 | 0.69 | 0.12 | 136 | | Estimate | AST |
| | | 30% | 82% | 8.97 | 2.91 | 2.97 | 5.06 | 0.89 | | | | |
| | | | | | | | | kg/ton | | | | |
| | 1F-DB | 39.2 | 22.5 | 3.98 | 3.42 | 0.61 | 3.81 | 0.28 | 864 | | Estimate | AST |
| | | 4.5% | 58% | 4.61 | 3.96 | 0.70 | 4.41 | 0.32 | | | | |
| | | | | | | | | kg/ton | | | | |
| 2nd separation | 2S-DB | 38.8 | 32.2 | 0.99 | 0.20 | 0.37 | 0.47 | 0.10 | 86 | | Estimate | AST |
| | | 45% | 83% | 11.51 | 2.28 | 4.29 | 5.43 | 1.21 | | | | |
| | | | | | | | | kg/ton | | | | |
| | 2F-DB | 2.0 | 1.2 | 0.23 | 0.20 | 0.03 | 0.22 | 0.02 | 50 | | Estimate | AST |
| | | 4.1% | 59% | 4.58 | 3.98 | 0.68 | 4.42 | 0.32 | | | | |
| | | | | | | | | kg/ton | | | | |
| 3rd separation | 3S-DB | 38.8 | 32.2 | 0.83 | 0.04 | 0.37 | 0.47 | 0.10 | 48 | | Estimate | AST |
| | | 80% | 83% | 17.23 | 0.83 | 7.63 | 9.65 | 2.16 | | | | |
| | | | | | | | | kg/ton | | | | |
| | 3F-DB | 0.0 | 0.0 | 0.16 | 0.16 | 0.00 | 0.00 | 0.00 | 38 | | Estimate | AST |
| | | 0.0% | 0% | 4.15 | 4.15 | 0.00 | 0.00 | 0.00 | | | | |
| Table 6. Three step separation on degassed biomass (DB) without pH regulator | | | | | | | | | | | | |
| Fiber fraction | 3S-DB | % of | 57.6% | 16.1% | 1.1% | 36.6% | 10.4% | 26.1% | 4.8% | | | |
| Liquid fraction | 1F-DB | total | 40.3% | 76.5% | 89.7% | 60.0% | 84.7% | 69.9% | 86.4% | on biogas plant | | |
| | 2F-DB | | 2.2% | 4.4% | 5.2% | 3.4% | 4.9% | 4.0% | 5.0% | | | |
| | 3F-DB | | 0.0% | 3.0% | 4.1% | 0.0% | 0.0% | 0.0% | 3.8% | | | |

TABLE 7

| | | TS | VS | \multicolumn{5}{c}{Nutrients in ton} | Q | | |
|---|---|---|---|---|---|---|---|---|---|---|---|
| | | ton | ton | $N_{total}$ | Amm-N | P | K | S | ton | pH | Test-doc |
| Degassed biomass | DB | 80.0 | 56.0 | 5.20 | 3.82 | 1.01 | 4.50 | 0.40 | 1000 | 8.5 | Info AU-Foulum |
| | | 8.0% | 70% | 5.20 | 3.82 | 1.01 | 4.50 | 0.30 kg/ton | | | |
| pH regulator | JGS2 | 20.1 | 14.7 | 1.29 | 0.42 | 0.19 | 1.52 | 0.09 | 300 | 5.1 | 1479295 oK-Lab |
| | | 6.7% | 73% | 4.30 | 1.39 | 0.64 | 5.06 | 0.30 kg/ton | | | |
| | DB+ | 100.1 | 70.7 | 6.49 | 4.24 | 1.20 | 6.02 | 0.49 | 1300 | | Estimate AST |
| 1st separation | 1S-DB+ | 49.0 | 40.9 | 1.71 | 0.40 | 0.77 | 1.12 | 0.22 | 163 | | Estimate AST |
| | | 30% | 83% | 10.45 | 2.47 | 4.69 | 6.84 | 1.37 kg/ton | | | |
| | 1F-DB+ | 51.1 | 29.7 | 4.78 | 3.83 | 0.43 | 4.90 | 0.27 | 1137 | | Estimate AST |
| | | 4.5% | 58% | 4.21 | 3.37 | 0.38 | 4.31 | 0.23 kg/ton | | | |
| 2nd separation | 2S-DB+ | 46.3 | 39.3 | 1.45 | 0.20 | 0.42 | 0.59 | 0.12 | 103 | | Estimate AST |
| | | 45% | 85% | 14.14 | 1.94 | 4.12 | 5.74 | 1.20 kg/ton | | | |
| | 2F-DB+ | 2.8 | 1.6 | 0.26 | 0.20 | 0.34 | 0.53 | 0.10 | 61 | | Estimate AST |
| | | 4.6% | 57% | 4.20 | 3.37 | 5.65 | 8.70 | 1.67 kg/ton | | | |
| 3rd separation | 3S-DB+ | 46.3 | 39.3 | 1.29 | 0.04 | 0.42 | 0.59 | 0.12 | 58 | | Estimate AST |
| | | 80% | 85% | 22.39 | 0.71 | 7.33 | 10.21 | 2.13 kg/ton | | | |
| | 3F-DB+ | 0.0 | 0.0 | 0.16 | 0.16 | 0.00 | 0.00 | 0.00 | 45 | | Estimate AST |
| | | 0.0% | 0% | 3.53 | 3.53 | 0.00 | 0.00 | 0.00 | | | |

Table 7. Three step separation on degassed biomass (DB) + grass silage juice (JGS2) added as pH regulator before 1st separation

| | | | TS | VS | $N_{total}$ | Amm-N | P | K | S | Q |
|---|---|---|---|---|---|---|---|---|---|---|
| Fiber fraction | 3S-DB+ | % of | 55.6% | 19.9% | 1.0% | 35.3% | 9.8% | 25.1% | 4.4% | |
| liquid fraction | 1F-DB+ | total | 42.1% | 73.7% | 90.5% | 36.2% | 81.4% | 54.3% | 87.4% | on biogas plant |
| | 2F-DB+ | | 2.3% | 3.9% | 4.8% | 28.5% | 8.8% | 20.6% | 4.7% | |
| | 3F-DB+ | | 0.0% | 0.0% | 2.4% | 3.7% | 0.0% | 0.0% | 3.5% | |

TABLE 8

| | | TS | VS | $N_{total}$ | Amm-N | P | K | S | Q | | |
|---|---|---|---|---|---|---|---|---|---|---|---|
| | | ton | ton | | | | | | ton | pH | Test-doc |
| Degassed biomass | DB | 80 | 56 | 5.20 | 3.82 | 1.01 | 4.50 | 0.40 | 1000 | 8.5 | Info AU-Foulum |
| | | 8.0% | 70% | 5.20 | 3.82 | 1.01 | 4.50 | 0.40 kg/ton | | | |
| 1st separation | 1S-DB | 40.8 | 33.5 | 1.22 | 0.40 | 0.40 | 0.69 | 0.03 | 136 | | Estimate AST |
| | | 30% | 82% | 8.97 | 2.91 | 2.97 | 5.06 | 0.22 kg/ton | | | |
| | 1F-DB | 39.2 | 22.5 | 3.98 | 3.42 | 0.61 | 3.81 | 0.37 | 864 | | Estimate A5T |
| | | 4.5% | 58% | 4.61 | 3.96 | 0.70 | 4.41 | 0.43 kg/ton | | | |
| pH regulator | JGS2 | 2.3 | 1.7 | 0.15 | 0.05 | 0.02 | 0.17 | 0.01 | 34 | 5.1 | 1479295 oK-Lab |
| | 1S-DB+ | 43.1 | 35.1 | 1.37 | 0.44 | 0.43 | 0.86 | 0.04 | 170 | | Estimate AST |
| | | 25% | 82% | 8.03 | 2.60 | 2.50 | 5.06 | 0.24 kg/ton | | | |
| 2nd separation | 2S-DB+ | 39.4 | 32.9 | 1.03 | 0.17 | 0.30 | 0.37 | 0.02 | 88 | | Estimate AST |
| | | 45% | 84% | 11.80 | 1.92 | 3.47 | 4.27 | 0.28 kg/ton | | | |
| | 2F-DB+ | 3.7 | 2.2 | 0.33 | 0.27 | 0.12 | 0.49 | 0.02 | 82 | | Estimate AST |
| | | 4.4% | 60% | 4.04 | 3.33 | 1.48 | 5.89 | 0.19 kg/ton | | | |
| 3rd separation | 3S-DB+ | 39.4 | 32.9 | 0.90 | 0.03 | 0.30 | 0.37 | 0.02 | 49 | | Estimate AST |
| | | 80% | 84% | 18.26 | 0.70 | 6.17 | 7.60 | 0.49 kg/ton | | | |
| | 3F-DB+ | 0.0 | 0.0 | 0.13 | 0.13 | 0.00 | 0.00 | 0.00 | 38 | | Estimate AST |
| | | 0.0% | 0% | 3.49 | 3.49 | 0.00 | 0.00 | 0.00 kg/ton | | | |

Table 8. Three step separation on degassed biomass (DB) + grass silage juice (JGS2) added as pH regulator after 1st separation

| | | | TS | VS | $N_{total}$ | Amm-N | P | K | S | Q |
|---|---|---|---|---|---|---|---|---|---|---|
| Fiber fraction | 3S-DB+ | % of | 57.1% | 16.8% | 0.9% | 29.5% | 8.0% | 5.9% | 4.8% | |
| Liquid fraction | 1F-DB | total | 39.1% | 74.5% | 88.6% | 58.7% | 81.6% | 90.2% | 83.6% | on biogas plant |
| | 2F-DB+ | | 3.8% | 6.2% | 7.1% | 11.8% | 10.4% | 3.9% | 8.0% | |
| | 3F-DB+ | | 0.0% | 2.5% | 3.5% | 0.0% | 0.0% | 0.0% | 3.7% | |

TABLE 9

| | | TS | VS | Nutrients in ton | | | | | Q | | | |
|---|---|---|---|---|---|---|---|---|---|---|---|---|
| | | ton | ton | $N_{total}$ | Amm-N | P | K | S | ton | pH | Test-doc | |
| Degassed biomass | DB | 80% | 56 | 5.20 | 3.82 | 1.01 | 4.50 | 0.40 | 1000 | 8.5 | Info | Au-Foulum |
| | | 8.0% | 70% | 5.20 | 3.82 | 1.01 | 4.50 | 0.40 kg/ton | | | | |
| 1st separation | 1S-DB | 40.8 | 33.5 | 1.22 | 0.40 | 0.40 | 0.69 | 0.12 | 136 | | Estimate | AST |
| | | 30% | 82% | 8.97 | 2.91 | 2.97 | 5.06 | 0.89 kg/ton | | | | |
| | 1F-DB | 39.2 | 22.5 | 3.98 | 3.42 | 0.61 | 3.81 | 0.28 | 864 | | Estimate | AST |
| | | 4.5% | 58% | 4.61 | 3.96 | 0.70 | 4.41 | 0.32 kg/ton | | | | |
| 2nd separation | 2S-DB | 38.6 | 32.2 | 0.99 | 0.20 | 0.35 | 0.47 | 0.09 | 86 | | Estimate | AST |
| | | 45% | 83% | 11.53 | 2.28 | 4.06 | 5.44 | 1.07 kg/ton | | | | |
| | 2F-DB | 2.2 | 1.3 | 0.23 | 0.20 | 0.06 | 0.22 | 0.03 | 50 | | Estimate | AST |
| | | 4.5% | 58% | 4.60 | 3.97 | 1.11 | 4.41 | 0.57 kg/ton | | | | |
| pH regulator | JGS2 | 2.9 | 2.1 | 0.24 | 0.06 | 0.03 | 0.22 | 0.01 | 43 | 5.1 | 1479295 | oK-Lab |
| | | 6.7% | 73% | 5.69 | 1.39 | 0.64 | 5.06 | 0.30 kg/ton | | | | |
| | 2S-DB+ | 41.4 | 34.2 | 1.23 | 0.26 | 0.38 | 0.68 | 0.10 | 129 | | Estimate | AST |
| 3rd separation | 3S-DB+ | 41.4 | 34.2 | 1.01 | 0.03 | 0.38 | 0.68 | 0.10 | 52 | | Estimate | AST |
| | | 80% | 83% | 19.45 | 0.59 | 7.25 | 13.18 | 2.02 kg/ton | | | | |
| | 3F-DB+ | 0.0 | 0.0 | 0.22 | 0.22 | 0.00 | 0.00 | 0.00 | 77 | | Estimate | AST |
| | | 0.0% | 0% | 2.93 | 2.93 | 0.00 | 0.00 | 0.00 kg/ton | | | | |

Table 9. Thee step separation on degassed biomass (DB) + grass silage juice (JGS2) added as pH regulator after 2nd separation

| | | | | | | | | | | | | |
|---|---|---|---|---|---|---|---|---|---|---|---|---|
| Fiber fraction | 3S-DB+ | % of total | 59.0% | 18.5% | 8.8% | 36.2% | 14.5% | 25.4% | 5.0% | | | |
| Liquid fraction | 1F-DB | | 38.8% | 73.1% | 88.3% | 58.4% | 88.8% | 67.7% | 82.9% | on biogas plant | | |
| | 2F-DB | | 2.2% | 4.3% | 5.1% | 5.4% | 4.7% | 6.9% | 4.8% | | | |
| | 3F-DB+ | | 0.0% | 4.1% | 5.8% | 0.0% | 0.0% | 0.0% | 7.4% | | | |

Example 4: pH Regulating Gas Absorption Medium

Degassed biomass is subjected to the three separations steps as illustrated in FIG. 2b. The third separation step include separating the dewatered solid fraction (2S-DB) into a third solid fraction (3S-DB, such as a dry fiber) and a third fluid fraction (3F-DB, which may be a steam comprising nitrogen, also referred to as N-steam).

The N-stream or the 3F-DB liquid fraction can by adding grass silage juice (JGS2) be converted to N± or N enriched liquid fertilizer with $NH_4\pm/N$ ratio of 83%, N/P ratio<4% and dry matter content<2% making a liquid fertilizer that is particularly suitable as fertilizer in green houses. The N enriched liquid fertilizer is obtained since the nitrogen gas absorption capacity increases at the lower pH. The resulting nitrogen enriched absorption medium may thus be efficiently used as nitrogen fertilizer.

The pH regulator, e.g. in the form of grass silage juice, may be added directly to the produced third fluid fraction (3F-DB). In addition, or alternatively, the pH regulator may be added before the third separation step, where the third separation step e.g. is a drying step. In the latter case, the grass silage juice is added to the 2S-DB, and the mixture of 2D-DB and pH regulator is subsequently exposed to the drying process.

Table 10 summarizes the characteristics of an N-steam, where grass silage juice ("pH regulator, JGS2") with a pH of about 5.1 is added to the N-steam either directly (3F-DB), or added to the 2S-DB before drying (also referred to as "3F-DB+"). It follows that the pH regulator makes it possible to reduce and regulate the pH of the 3F-DB and resulting liquid fertilizer. It further follows that both the pH, the nutrient content, and dry matter content of the resulting 3F-DB can be tailored by adding the pH regulator to selected different fractions. For example, a higher Amm-N and a lower dry matter content was obtained when adding JGS2 to the 3F-DB directly, whereas a higher P and K content was obtained when adding JGS2 before drying (cf. Table 10).

Table 10. Characteristics of degassed biomass subjected to the first, second and third solid-liquid separation, as illustrated in FIG. 2b, where grass silage juice ("pH regulator, JGS2") is present in the third fluid fraction (3F-DB) by being added after the third separation (3F-DB) or before the third separation (3F-DB+).

TABLE 10

Table 10 N-absorption on liquid fraction 3F-DB or 3F-DB+ from 3rd separation by use of JFS2 as pH regulator

| | | TS | VS | Nutrients in ton | | | | | Q | | | |
|---|---|---|---|---|---|---|---|---|---|---|---|---|
| | | ton | ton | $N_{total}$ | Amm-N | P | K | S | ton | pH | Test-doc | |
| 3F-DB (table 6) | | | | | | | | | | | | |
| Steam 3rd separation | 3F-DB | 0.0 | 0.0 | 4.15 | 4.15 | 0.00 | 0.00 | 0.00 | 1000 | | from table 6 | |
| pH regulator | JGS2 | 22.1 | 16.1 | 1.42 | 0.46 | 0.21 | 1.67 | 0.10 | 330 | 5.1 | 1479295 | oK-Lab |

TABLE 10-continued

Table 10 N-absorption on liquid fraction 3F-DB or 3F-DB+ from 3rd separation by use of JFS2 as pH regulator

|  |  | TS | VS | Nutrients in ton | | | | | Q | | |
|---|---|---|---|---|---|---|---|---|---|---|---|
|  |  | ton | ton | $N_{total}$ | Amm-N | P | K | S | ton | pH | Test-doc |
| Liquid fertilizer |  | 22.1 | 16.1 | 5.57 | 4.61 | 0.21 | 1.67 | 0.10 | 1330 |  | Estimate AST |
|  |  | 1.7% | 73% | 4.19 | 3.47 | 0.16 | 1.26 | 0.07 |  |  |  |
|  |  |  |  |  |  |  |  | kg/ton |  |  |  |
| 3F-DB+ (table 9) |  |  |  |  |  |  |  |  |  |  |  |
| Steam 3rd separation | 3F-DB+ | 0.0 | 0.0 | 2.93 | 2.93 | 0.00 | 0.00 | 0.00 | 1000 |  | from table 9 |
| pH regulator | JGS2 | 33.5 | 24.4 | 2.15 | 0.70 | 0.32 | 2.53 | 0.15 | 500 | 5.1 | 1479295 oK-Lab |
| Liquid fertilizer |  | 33.5 | 24.4 | 5.08 | 3.63 | 0.32 | 2.53 | 0.15 | 1500 |  | Estimate AST |
|  |  | 2.2% | 73% | 3.39 | 2.42 | 0.21 | 1.69 | 0.10 |  |  |  |
|  |  |  |  |  |  |  |  | kg/ton |  |  |  |

Example 5: Use of pH Regulated Degassed Biomass as Mushroom Substrate

Degassed biomass is subjected to the three separations steps as illustrated in FIG. 2b. The third solid fraction (3S-DB) may be a dried fiber, which can be used as mushroom substrate, plant substrate, organic fertilizer, or bedding material for poultry, horses or cattle.

The pH regulator, e.g. in the form of grass silage juice, may be added directly to the produced third fluid fraction (3S-DB). In addition, or alternatively, the pH regulator may be added before the third separation step, where the third separation step e.g. is a drying step. In the latter case, the grass silage juice is added to the 2S-DB, and the mixture of 2D-DB and pH regulator is subsequently exposed to the drying process.

Thus, the pH regulator is either added directly to the 3S-DB together with water and mycelium (mushroom) or seeds (plant) or added after the second separation to the 2S-DB (i.e. before the third separation step, e.g. drying). In the latter case, only water and mycelium (mushroom) or seeds (plant) need to be added before cultivation, and the substrate may be considered as being in an improved "ready-to-use" form.

The resulting characteristics of the regulated 3S-DB ("phase 3 substrate") are summarized in Table 11, where pH regulator with a pH of about 5.1 is added directly to the 3S-DB (i.e. the fiber fraction) or added before the third separation step, where "3S-DB+" refers to the resulting phase 3 substrate after addition of pH regulator to 2S-DB. It follows that the pH regulator can make it possible to reduce and regulate the pH of the 3S-DB. It further follows that both the pH, the nutrient content, and dry matter content of the resulting 3F-DB can be tailored by adding the pH regulator to selected different fractions. For example, a higher K content is obtained for 3S-DB+, whereas a higher amm-N content is obtained for 3S-DB.

Table 11. Characteristics of degassed biomass subjected to the first, second, and third solid-liquid separation, as illustrated in FIG. 2b, where grass silage juice ("pH regulator, JGS2") is added to the second solid fraction 2S-DB (resulting in the substrate 3S-DB+), or added directly to the third solid fraction (resulting in the substrate 3S-DB).

TABLE 11

Table 11: Phase 3 mushroom substrate on fiber fraction 3S-DB+ or 3S-DB and grass silage juice JGS2 as pH regulator

|  |  | TS | VS | Nutrients in ton | | | | | Q | | |
|---|---|---|---|---|---|---|---|---|---|---|---|
|  |  | ton | ton | $N_{total}$ | Amm-N | P | K | S | ton | pH | Test-doc |
| 3S-DB (table 6) + JGS2 + water |  |  |  |  |  |  |  |  |  |  |  |
| Fiber fraction | 3S-DB | 800.0 | 665.6 | 17.23 | 0.83 | 7.63 | 9.65 | 2.16 | 1000 |  | from table 6 |
| pH regulator | JGS2 | 15.4 | 11.2 | 0.99 | 0.32 | 0.15 | 1.16 | 0.07 | 230 | 5.1 | 1479295 oK-Lab |
| Water |  |  |  |  |  |  |  |  | 1250 |  |  |
| Phase 3 substrate |  | 815.4 | 676.8 | 18.22 | 1.15 | 7.78 | 10.82 | 2.23 | 2480 |  | Estimate AST |
|  |  | 32.9% | 83% | 7.35 | 0.46 | 3.14 | 4.36 | 0.90 |  |  |  |
|  |  |  |  |  |  |  |  | kg/ton |  |  |  |
| 3S-DB + (table 9) + water |  |  |  |  |  |  |  |  |  |  |  |
| Fiber fraction | 3S-DB+ | 800.0 | 661.4 | 23.55 | 0.59 | 7.25 | 13.18 | 2.02 | 1000 |  | from table 9 |
| Water |  |  |  |  |  |  |  |  | 1430 |  |  |
| Phase 3 substrate |  | 800.0 | 661.4 | 23.55 | 0.59 | 7.25 | 13.18 | 2.02 | 2430 |  | Estimate AST |
|  |  | 32.9% | 83% | 9.69 | 0.24 | 2.98 | 5.42 | 0.83 |  |  |  |
|  |  |  |  |  |  |  |  | kg/ton |  |  |  |

Example 6: Use of Fish Manure as pH Regulator

In addition, or as alternative, to juice derived from agricultural biomass such as grass, then juice derived from fish manure may be used as pH regulator in a similar manner.

Reject water from a fish farm comprising fish manure was collected, and the reject water was separated by sedimentation into a solid fish manure sediment, and a fish manure liquid. The solid fish manure sediment was further separated into a second solid fish manure cake, and a fish manure liquid juice. The pH of the fish manure liquid juice was about 5.7 and has a relative high ammonium content (Amm-N), cf. Table 1.

The solid fish manure sediment may subsequently be used as feed stock for biogas. The fish manure liquid juice may be used as pH regulator in a similar manner as grass silage juice, as described in Examples 2-5. For example, advantageously, fish manure liquid juice may be added to degassed biomass, or different fractions thereof e.g. before/after performing one or more separation steps. It follows that the pH regulator can make it possible to reduce and regulate the pH of e.g. the 3S-DB. It further follows that both the pH, the nutrient content, and dry matter content of e.g. the resulting 3S-DB can be tailored by adding the pH regulator to selected different fractions.

Items

The presently disclosed may be described in further detail with reference to the following items.

1. A method of pH regulating biomass residues, comprising the steps of:
   providing biomass residue comprising solid and liquid parts,
   exposing the biomass to one or more separation steps, wherein said biomass is separated into one or more solid fractions having a reduced content of water, and one or more fluid fractions,
   adding a pH regulator to the biomass residue, and/or the one or more solid fractions, and/or the one or more fluid fractions, wherein the pH regulator comprises a juice derived from agricultural biomass and/or fish manure.

2. The method according to item 1, wherein the agricultural biomass is plant biomass, such as grass, and preferably is ensiled agricultural biomass.

3. The method according to any of the preceding items, wherein the biomass residue is selected from the group of: fresh biomass, such as fresh liquid manure from cattle, horses, pigs, or poultry livestock, and fermented biomass, such as degassed biomass from an anaerobic fermenter, and combinations thereof.

4. The method according to item 3, wherein the biomass is fresh liquid manure (M), and comprises the steps of:
   exposing the manure (M) to a first separation step, wherein said fresh manure is separated into a first solid manure fraction (1S-M) having a reduced content of water, and a first fluid manure fraction (1F-M),
   exposing the first solid manure fraction (1S-M) to a second separation step, wherein said solid manure (1S-M) is separated into a second solid manure fraction (2S-M) having a reduced content of water, and a second fluid manure fraction (2F-M), and
   wherein the pH regulator is added to the fresh manure, and/or the first solid fraction (1S-M), and/or the second fluid fraction (2F-M).

5. The method of item 4, wherein the pH regulator is added to the fresh manure, or the first solid manure fraction (1S-M), or the first fluid manure fraction (1F-M).

6. The method according to item 3, wherein the biomass is degassed biomass (DB) from an anaerobic fermenter, and comprises the steps of:
   exposing the DB to a first separation step, wherein said DB is separated into a first solid degassed biomass fraction (1S-DB) having a reduced content of water, and a first fluid degassed biomass fraction (1F-DB),
   exposing the first solid degassed biomass fraction (1S-DB) to a second separation step, wherein said first solid fraction (1S-DB) is separated into a second solid degassed biomass fraction (2S-DB) having a reduced content of water, and a second fluid degassed biomass fraction (2F-DB),
   exposing the second solid degassed biomass fraction (2S-DB) to a third separation step, wherein said second solid fraction (2S-DB) is separated into a third solid degassed biomass fraction (3S-DB) having a reduced content of water, and a third fluid degassed biomass fraction (3F-DB), and
   wherein the pH regulator is added to the degassed biomass (DB), and/or the first solid fraction (1S-DB), and/or the second solid fraction (2S-DB), and/or the third solid fraction (3S-DB), and/or the first fluid fraction (1F-DB), and/or the second fluid fraction (2F-DB), and/or the third fluid fraction (3F-DB).

7. The method according to item 6, wherein the pH regulator is added to the degassed biomass (DB), or the first fluid fraction (1F-DB), or the first solid fraction (1S-DB), or the second solid fraction (2S-DB), or the third solid fraction (3S-DB), or a combination of two of said fractions.

8. The method according to any of the preceding items, wherein the one or more separations steps are solid-fluid separations, such as dewatering and/or drying.

9. The method according to any of the preceding items, wherein the one or more separations steps are obtained by screening, centrifuging, filter pressing, screw pressing, single screw pressing, twin screw pressing, drying, and combinations thereof, and preferably is a combination of twin screw pressing and drying.

10. The method according to any of the preceding items, wherein the one or more separation steps are adapted to provide a biomass fraction with a dry matter content of 25-85 wt %, preferably 30-70 wt % or 40-60 wt %.

11. The method according to any of the preceding items, wherein the pH regulator is added to biomass comprising a liquid part of 10-50 wt %, more preferably 15-40 wt % or 20-30 wt %.

12. The method according to any of the preceding items, wherein the pH regulator is added to biomass comprising a dry matter content of 25-85 wt %, more preferably 30-70 wt % or 40-60 wt %.

13. The method according to any of items 2-12, wherein the juice derived from grass is selected from the group of grass juice and processed grass juice, such as grass silage, grass silage juice, and/or brown juice, and preferably is processed grass juice, most preferably grass silage juice.

14. The method according to any of items 2-13, wherein the juice derived from grass comprises lactic acid in a concentration between 0.3-12 wt %, more preferably 0.4-10 wt %, or 0.5-5 wt %, or 0.5-2 wt %.

15. The method according to any of the preceding items, wherein the amount of pH regulator added to the biomass is between 10-60 wt %, more preferably 25-50 wt % or 30-40 wt %.

16. The method according to any of the preceding items, wherein the amount of pH regulator added to the biomass is adapted to provide a solid biomass fraction having a pH of between 5-8, more preferably between 5.5-7.5, and most preferably between 6.0-7.0.

17. The method according to any of the preceding items, wherein the amount of pH regulator added to the biomass is adapted to provide a fluid biomass fraction having a pH equal to or below 7, more preferably between 5-7, and most preferably between 5.5-6.5.

18. The method according to any of items 2-16, wherein the anaerobic fermenter is a part of a biogas plant.

19. Use of the pH regulated biomass fractions obtained by any of items 1-18 as fertilizer, soil improver, litter or bedding for animals, substrate for cultivating fungal cells and/or spores, substrate for cultivating plants, gas absorption medium, and feedstock for biogas.

20. The use according to item 19, wherein the gas absorption medium is further used as a fertilizer.

The invention claimed is:

1. A method of pH regulating biomass residues, comprising the steps of:
   providing biomass residue comprising solid and liquid parts;
   exposing the biomass to one or more separation steps, wherein said biomass is separated into one or more solid fractions having a reduced content of water, and one or more fluid fractions; and
   adding a pH regulator to the biomass residue, and/or the one or more solid fractions, and/or the one or more fluid fractions;
   wherein the pH regulator comprises a juice derived from agricultural biomass and/or fish manure.

2. The method according to claim 1, wherein the agricultural biomass is grass.

3. The method according to claim 2, wherein the juice derived from grass is selected from the group of grass juice and processed grass juice.

4. The method according to claim 2, wherein the juice derived from grass comprises lactic acid in a concentration between 0.3-12 wt %.

5. The method according to claim 2, wherein the juice derived from grass is selected from the group consisting of: grass silage, grass silage juice, brown juice, and combinations thereof.

6. The method according to claim 1, wherein the biomass residue is selected from the group of: fresh biomass, and fermented biomass, and combinations thereof.

7. The method according to claim 6, wherein the biomass residue is fresh liquid manure (M), and comprises the steps of:
   exposing the manure (M) to a first separation step, wherein said manure is separated into a first solid manure fraction (1S-M) having a reduced content of water, and a first fluid manure fraction (1F-M);
   exposing the first solid manure fraction (1S-M) to a second separation step, wherein said solid manure (1S-M) is separated into a second solid manure fraction (2S-M) having a reduced content of water, and a second fluid manure fraction (2F-M); and
   wherein the pH regulator is added to the fresh manure, and/or the first solid fraction (1S-M), and/or the second fluid fraction (2F-M).

8. The method according to claim 6, wherein the biomass residue is degassed biomass (DB) from an anaerobic fermenter, and comprises the steps of:
   exposing the DB to a first separation step, wherein said DB is separated into a first solid degassed biomass fraction (1S-DB) having a reduced content of water, and a first fluid degassed biomass fraction (1F-DB);
   exposing the first solid degassed biomass fraction (1S-DB) to a second separation step, wherein said first solid fraction (1S-DB) is separated into a second solid degassed biomass fraction (2S-DB) having a reduced content of water, and a second fluid degassed biomass fraction (2F-DB);
   exposing the second solid degassed biomass fraction (2S-DB) to a third separation step, wherein said second solid fraction (2S-DB) is separated into a third solid degassed biomass fraction (3S-DB) having a reduced content of water, and a third fluid degassed biomass fraction (3F-DB); and
   wherein the pH regulator is added to the degassed biomass (DB), and/or the first solid fraction (1S-DB), and/or the second solid fraction (2S-DB), and/or the third solid fraction (3S-DB), and/or the first fluid fraction (1F-DB), and/or the second fluid fraction (2F-DB), and/or the third fluid fraction (3F-DB).

9. The method according to claim 1, wherein the agricultural biomass is plant biomass.

10. The method according to claim 1, wherein the one or more separation steps are solid-fluid separations.

11. The method according to claim 1, wherein the one or more separation steps are obtained by screening, centrifuging, filter pressing, screw pressing, single screw pressing, twin screw pressing, drying, and combinations thereof.

12. The method according to claim 1, wherein the one or more separation steps are adapted to provide a biomass fraction with a dry matter content of 25-85 wt %.

13. The method according to claim 1, wherein the pH regulator is added to biomass comprising a liquid part of 10-50 wt %, and/or wherein the pH regulator is added to biomass comprising a dry matter content of 25-85 wt %.

14. The method according to claim 1, wherein the amount of pH regulator added to the biomass is between 10-60 wt %.

15. The method according to claim 1, wherein the amount of pH regulator added to the biomass is adapted to provide a solid biomass fraction having a pH of between 5-8.

16. The method according to claim 1, wherein the amount of pH regulator added to the biomass is adapted to provide a fluid biomass fraction having a pH equal to or below 7.

17. The method according to claim 1, wherein the agricultural biomass is ensiled agricultural biomass.

18. The method according to claim 1, wherein the biomass residue is degassed biomass from an anaerobic fermenter.

19. The method according to claim 1, wherein the one or more separation steps are obtained by a combination of one or more twin screw pressing and drying.

20. A method of using a pH regulated biomass fraction, in a method of fertilizing, soil improving, littering or bedding for animals, preparing substrate for cultivating fungal cells and/or spores, preparing substrate for cultivating plants, preparing gas absorption medium, or preparing feedstock for biogas, comprising the steps of:
   providing a pH regulated biomass fraction, comprising the steps of;
   providing biomass residue comprising solid and liquid parts;
   exposing the biomass to one or more separation steps, wherein said biomass is separated into one or more solid fractions having a reduced content of water, and one or more fluid fractions; and
   adding a pH regulator to the biomass residue, and/or the one or more solid fractions, and/or the one or more fluid fractions;
   wherein the pH regulator comprises a juice derived from agricultural biomass and/or fish manure; and
   applying said fraction as fertilizer, soil improver, litter or bedding for animals, substrate for cultivating fungal cells and/or spores, substrate for cultivating plants, gas absorption medium, or feedstock for biogas.

* * * * *